United States Patent
Park et al.

(10) Patent No.: US 12,432,467 B2
(45) Date of Patent: Sep. 30, 2025

(54) IMAGE SENSOR AND CAMERA MODULE INCLUDING IMAGE SENSOR

(71) Applicant: SAMSUNG ELECTRONICS CO., LTD., Suwon-si (KR)

(72) Inventors: Chanmin Park, Suwon-si (KR); Seonghyeon Park, Suwon-si (KR); Kyunghoon Kim, Suwon-si (KR); Moo Young Kim, Suwon-si (KR); Sunjung Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 151 days.

(21) Appl. No.: 18/232,000

(22) Filed: Aug. 9, 2023

(65) Prior Publication Data

US 2024/0244345 A1 Jul. 18, 2024

(30) Foreign Application Priority Data

Jan. 13, 2023 (KR) .................. 10-2023-0005631

(51) Int. Cl.
*H04N 25/60* (2023.01)
*H04N 25/77* (2023.01)
*H04N 25/78* (2023.01)

(52) U.S. Cl.
CPC ............. *H04N 25/60* (2023.01); *H04N 25/77* (2023.01); *H04N 25/78* (2023.01)

(58) Field of Classification Search
CPC ........ H04N 25/60; H04N 25/77; H04N 25/78; H04N 25/617; H04N 25/70; H04N 23/54; H04N 25/11; H10F 39/803; H10F 39/811
See application file for complete search history.

(56) References Cited

U.S. PATENT DOCUMENTS

| | | | |
|---|---|---|---|
| 8,916,919 B2 | 12/2014 | Thompson et al. | |
| 10,574,926 B2 | 2/2020 | Bairo | |
| 10,892,099 B2* | 1/2021 | Kabir | H01L 23/5225 |
| 2009/0128991 A1 | 5/2009 | Mauritzson | |
| 2019/0158771 A1* | 5/2019 | Bairo | H01L 23/5223 |
| 2021/0058579 A1* | 2/2021 | Beck | H03M 1/46 |
| 2022/0123762 A1* | 4/2022 | Ma | H01L 23/5223 |
| 2023/0022468 A1* | 1/2023 | Morishita | H04N 25/78 |

FOREIGN PATENT DOCUMENTS

| | | |
|---|---|---|
| CN | 110661990 A | 1/2020 |
| CN | 115020402 A | 9/2022 |
| KR | 10-2007-0075017 A | 7/2007 |

* cited by examiner

Primary Examiner — Nhan T Tran
(74) Attorney, Agent, or Firm — Sughrue Mion, PLLC

(57) ABSTRACT

An image sensor includes a pixel array including a plurality of pixels; a ramp signal generator configured to generate a ramp signal; a plurality of first attenuators with each first attenuator connected to a respective column of the plurality of pixels, and each first attenuator configured to receive a pixel signal from a respective pixel belonging to a selected row; a plurality of second attenuators with each second attenuator corresponding to a respective column, and each second attenuator configured to receive the ramp signal from the ramp signal generator; and a plurality of analog-to-digital converters configured to output digital signals by comparing first signals output from the plurality of first attenuators and second signals output from the plurality of second attenuators, in which each of the plurality of first attenuators and each of the plurality of second attenuators comprises a first capacitor and a second capacitor.

20 Claims, 18 Drawing Sheets

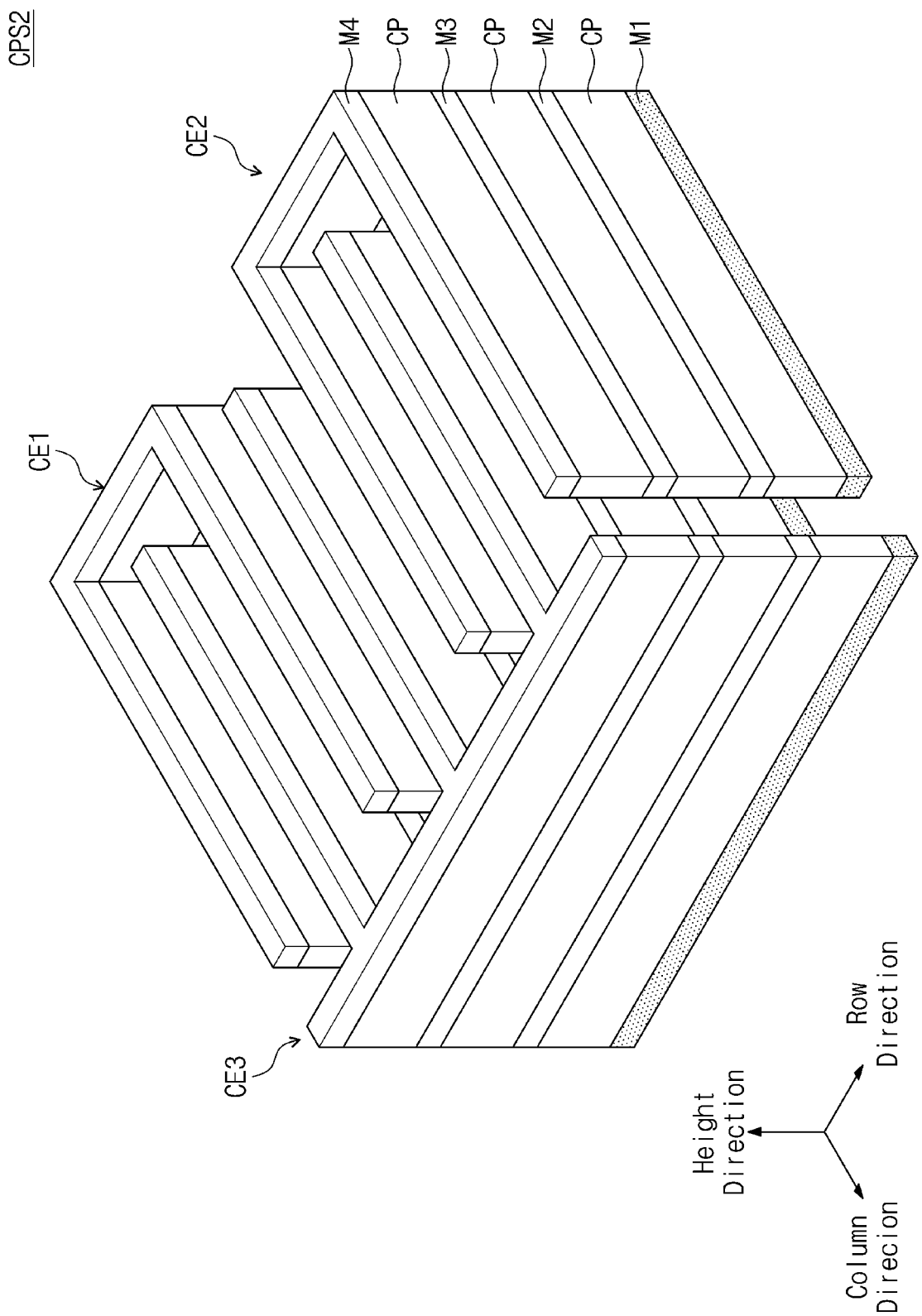

IMAGE SENSOR AND CAMERA MODULE INCLUDING IMAGE SENSOR

CROSS-REFERENCE TO RELATED APPLICATIONS

This application claims priority under 35 U.S.C. § 119 to Korean Patent Application No. 10-2023-0005631 filed on Jan. 13, 2023, in the Korean Intellectual Property Office, the disclosures of which are incorporated by reference herein in their entireties.

BACKGROUND

Embodiments of the present disclosure described herein relate to an electronic device, and more particularly, relate to an image sensor including capacitors having a reduced noise and a camera module including the image sensor.

A capacitor is used in various electronic devices. An image sensor or a camera module including an image sensor also uses various types of capacitors. As the area of an electrode of a capacitor becomes larger, a capacitance of the capacitor may increase. However, as the area of the electrode of the capacitor becomes larger, also, a parasitic capacitance formed between the electrode of the capacitor and a surrounding conductive material may increase, causing signal interference or degradation.

The image sensor or the camera module may use capacitors in the process of sensing an image signal. The parasitic capacitance of the capacitor may act as a noise in the image signal. In particular, as a pixel becomes finer, a circuit corresponding to the pixel also becomes finer. As the circuit becomes finer (e.g., smaller), the noise caused by the parasitic capacitance may have a greater influence on the image signal.

SUMMARY

Embodiments of the present disclosure provide an image sensor having a reduced noise even though manufactured with a nano-scale manufacturing technology and a camera module including the image sensor.

According to one or more embodiments, an image sensor comprises: a pixel array including a plurality of pixels; a ramp signal generator configured to generate a ramp signal; a plurality of first attenuators with each first attenuator connected to a respective column of the plurality of pixels, and each first attenuator configured to receive a pixel signal from a respective pixel belonging to a selected row from among the plurality of pixels; a plurality of second attenuators with each second attenuator corresponding to a respective column of the plurality of pixels, and each second attenuator configured to receive the ramp signal from the ramp signal generator; and a plurality of analog-to-digital converters configured to output digital signals by comparing first signals output from the plurality of first attenuators and second signals output from the plurality of second attenuators, wherein each of the plurality of first attenuators and each of the plurality of second attenuators comprises a first capacitor and a second capacitor, and wherein the first capacitor and the second capacitor are between two guard rings having a pitch corresponding to one column from the columns of the plurality of pixels so as to be symmetrical along a second direction perpendicular to a first direction in which the two guard rings extend.

According to one or more embodiments, a camera module comprises: a lens; a pixel array including a plurality of pixels configured to receive a light through the lens; a ramp signal generator configured to generate a ramp signal; a plurality of first attenuators with each first attenuator connected to a respective column of the plurality of pixels, and each first attenuator configured to receive a pixel signal from a respective pixel belonging to a selected row from among the plurality of pixels; a plurality of second attenuators with each second attenuator corresponding to the a respective column of the plurality of pixels, and each second attenuator configured to receive the ramp signal from the ramp signal generator; and a plurality of analog-to-digital converters configured to output digital signals by comparing first signals output from the plurality of first attenuators and second signals output from the plurality of second attenuators; a memory configured to store the digital signals; a logic circuit configured to perform a compensation operation on the digital signals stored in the memory; and an interface circuit configured to output the digital signals experiencing the compensation operation to an external device in units of one or more frames, wherein each of the plurality of first attenuators and each of the plurality of second attenuators comprises a first capacitor and a second capacitor, and wherein the first capacitor and the second capacitor are between two guard rings having a pitch corresponding to one column among the columns of the plurality of pixels so as to be symmetrical along a direction perpendicular to a direction in which the two guard rings extend.

According to one or more embodiments, an image sensor comprises: a pixel array including a plurality of pixels; a ramp signal generator configured to generate a ramp signal; and a plurality of first attenuators with each first attenuator connected to a respective column of the plurality of pixels, and each first attenuator configured to receive a pixel signal from a respective pixel belonging to a selected row from among the plurality of pixels; a plurality of second attenuators with second attenuator corresponding to a respective column of the plurality of pixels, and each second attenuator configured to receive the ramp signal from the ramp signal generator; and a plurality of analog-to-digital converters configured to output digital signals by comparing first signals output from the plurality of first attenuators and second signals output from the plurality of second attenuators, wherein each of the plurality of first attenuators and each of the plurality of second attenuators comprises a first capacitor and a second capacitor, wherein the first capacitor and the second capacitor are between two guard rings having a pitch corresponding to one column among the columns of the plurality of pixels so as to be symmetrical along a second direction perpendicular to a first direction in which the two guard rings extend, wherein the first capacitor and the second capacitor comprise: a first conductive material extending along the second direction, a second conductive material extending along the second direction and isolated from the first conductive material, at least two first conductive fingers extending from the first conductive material to be parallel along the first direction, at least two second conductive fingers extending from the second conductive material to be parallel along the first direction, a third conductive material extending along the second direction, and at least two third conductive fingers extending from the third conductive material along a direction away from the first direction, wherein one of the at least two third conductive fingers extends between the at least two first conductive fingers along the direction away from the first direction, and wherein the other of the at least two third conductive fingers extends between the at least two second conductive fingers along the direction away from the first direction.

BRIEF DESCRIPTION OF DRAWINGS

The above and other objects and features of the present disclosure will become apparent by describing in detail embodiments thereof with reference to the accompanying drawings.

FIGS. 9A, 9B, and 9C illustrate examples in which a second capacitor structure is stacked in metal layers according to one or more embodiments.

DETAILED DESCRIPTION

Below, embodiments of the present disclosure will be described in detail and clearly to such an extent that an ordinary one in the art easily implements the present disclosure.

The embodiments described herein are example embodiments, and thus, the disclosure is not limited thereto and may be realized in various other forms. It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Spatially relative terms, such as "over," "above," "on," "upper," "below," "under," "beneath," "lower," "left," "right," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Figure 1:
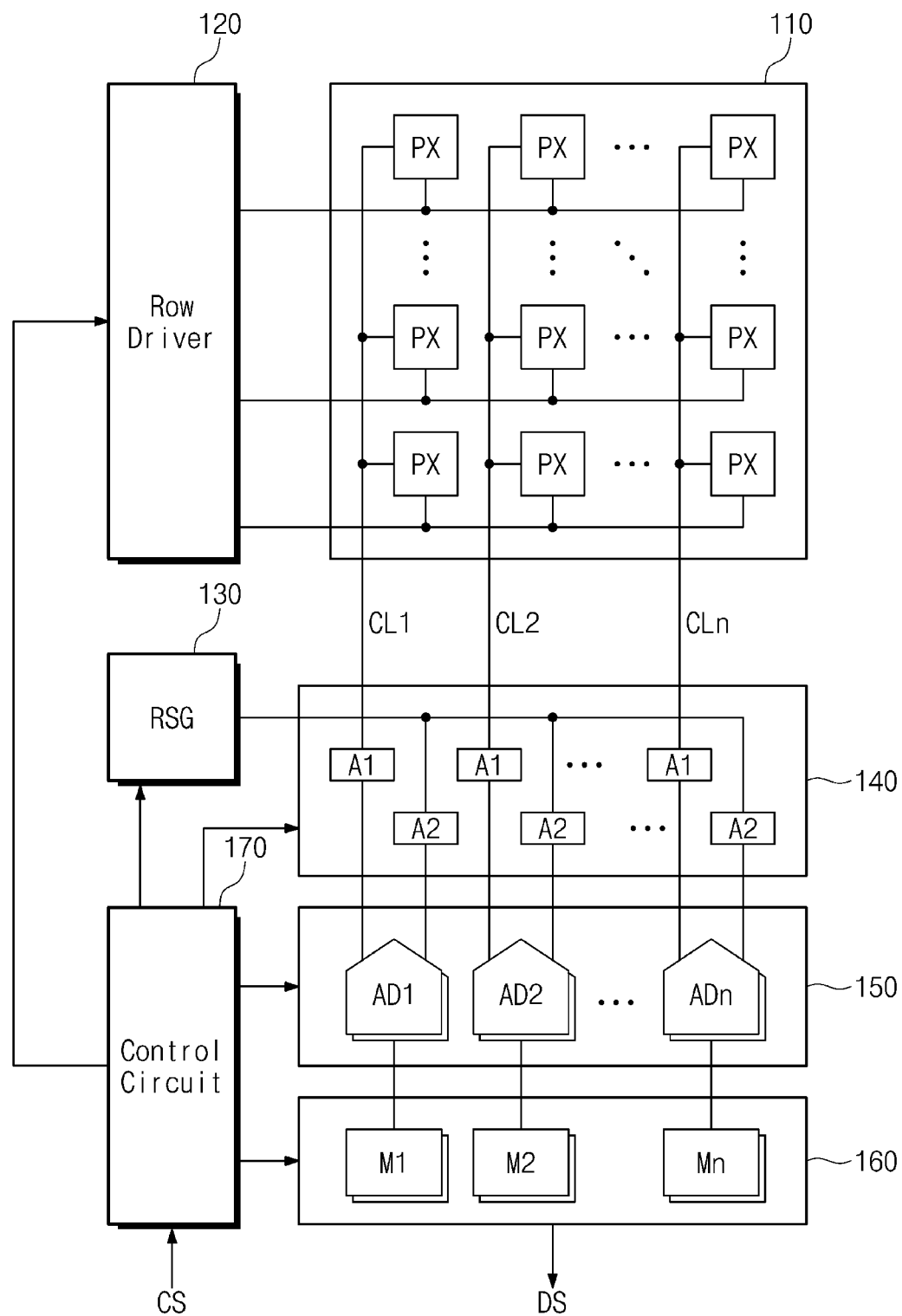
FIG. 1 illustrates an image sensor according to one or more embodiments of the present disclosure.

FIG. 1 illustrates an image sensor 100 according to one or more embodiments of the present disclosure. Referring to FIG. 1, the image sensor 100 may include a pixel array 110, a row driver 120, a ramp signal generator (RSG) 130, an attenuation circuit 140, an analog-to-digital conversion circuit 150, a memory circuit 160, and a control circuit 170.

The pixel array 110 may include a plurality of pixels PX arranged along rows and columns in the form of a matrix. Each of the plurality of pixels PX may include a photo detector. For example, the photo detector may include a photo diode, a photo transistor, a photo gate, a pinned photodiode, etc. Each of the plurality of pixels PX may sense a light by using the photo detector and may convert the amount of sensed light into an electrical signal, for example, a voltage or a current.

Rows of the plurality of pixels PX may be respectively connected to first to m-th row lines RL1 to RLm (e.g., m being a positive integer). Each column of the plurality of pixels PX may be connected to a respective column such as first to n-th column lines CL1 to CLn (e.g., n being a positive integer). Each of the plurality of pixels PX may include two or more sub-pixels. The two or more sub-pixels of each of pixels PX connected to a selected row line among the first to m-th row lines RL1 to RLm may sequentially output pixel signals corresponding to the amount of incident light to the corresponding column line, or may simultaneously output the pixel signals to the corresponding column line.

A color filter array (CFA) and lenses may be stacked on the pixel array 110. The color filter array may include red (R) filters, green (G) filters, and blue (B) filters. Two or more different color filters may be disposed at the plurality of pixels PX. For example, at least one blue color filter, at least one red color filter, and at least two green color filters may be disposed at the plurality of pixels PX.

The row driver 120 may be connected to the rows of the pixels PX of the pixel array 110 through the first to m-th row lines RL1 to RLm (e.g., m being a positive integer). The row driver 120 may decode an address and/or a control signal generated by the control circuit 170. Depending on a result of the decoding, the row driver 120 may sequentially select the first to m-th row lines RL1 to RLm of the pixel array 110 and may drive a selected row line with a specific voltage. For example, the row driver 120 may drive the selected row line with a voltage appropriate for sensing a light.

Each of the first to m-th row lines RL1 to RLm connected to the rows of the pixels PX may include two or more lines. The two or more lines may propagate, for example, various signals including a signal for selecting (e.g., activating) photo detectors of a pixel, a signal for resetting a floating diffusion node, a signal for selecting a column line, a signal for adjusting a conversion gain, etc.

Figure 2:
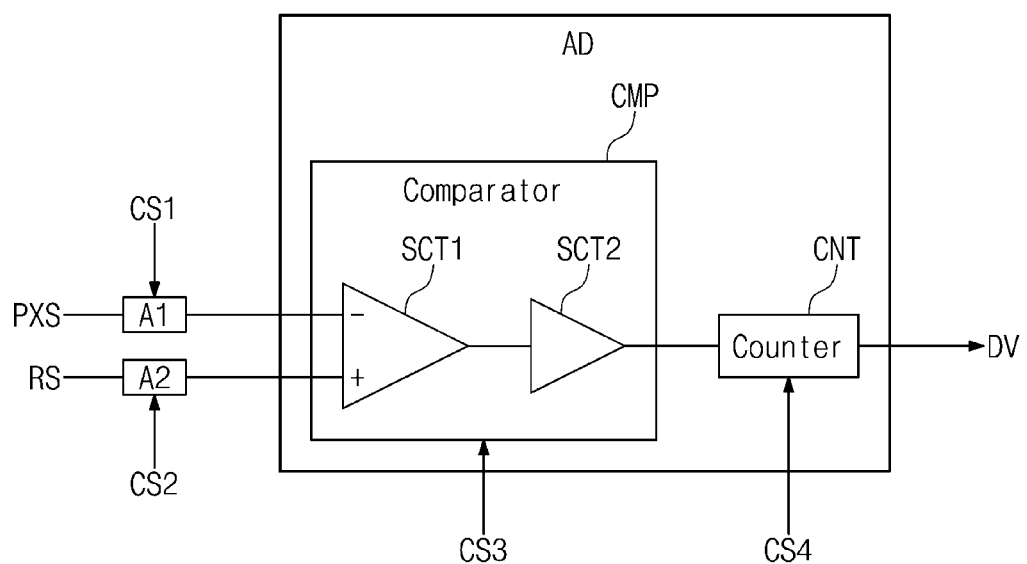
FIG. 2 illustrates an example of one analog-to-digital converter and a first attenuator and a second attenuator corresponding to the one analog-to-digital converter according to one or more embodiments.

The ramp signal generator 130 (e.g., RSG in FIG. 1) may generate a ramp signal RS (refer to FIG. 2). The ramp signal generator 130 may operate under control of the control circuit 170. For example, the ramp signal generator 130 may operate in response to various control signals such as a ramp enable signal and a mode signal. In response to activation of ramp enable signal, the ramp signal generator 130 may generate the ramp signal RS that decreases or increases with a slope (e.g., rate of decrease or increase) that is set based on the mode signal. For example, the ramp signal generator 130 may generate the ramp signal RS that continuously decreases or increases from an initial level over time according to a preset slope or rate.

The attenuation circuit 140 may be connected to the columns of the pixels PX of the pixel array 110 through the first to n-th column lines CL1 to CLn. The attenuation circuit 140 may receive the ramp signal RS from the ramp signal generator 130. The attenuation circuit 140 may pass pixel signals transferred through the first to n-th column lines CL1 to CLn and the ramp signal RS or may attenuate and pass the pixel signals and the ramp signal RS. For example, under control of the control circuit 170, the attenuation circuit 140 may attenuate the pixel signals and the ramp signal RS or may not attenuate the pixel signals and the ramp signal RS.

The attenuation circuit 140 may include first attenuators A1 that attenuate and pass the pixel signals of the first to n-th column lines CL1 to CLn or pass the pixel signals of the first to n-th column lines CL1 to CLn without attenuation, and second attenuators A2 that attenuate and pass the ramp signal RS or pass the ramp signal RS without attenuation. The attenuation circuit 140 may transfer the pixel signals and the ramp signal RS, which are attenuated or are not attenuated, to the analog-to-digital conversion circuit 150. In one or more embodiments, current sources (e.g., current sinks) (not illustrated) that are configured to allow a constant current to flow to the first to n-th column lines CL1 to CLn such that a noise is suppressed may be provided in front of the first attenuators A1.

The analog-to-digital conversion circuit 150 may receive the pixel signals (e.g., attenuated or not attenuated) and the ramp signals RS (e.g., attenuated or not attenuated) from the attenuation circuit 140. The analog-to-digital conversion circuit 150 may be connected to the columns of the pixels PX of the pixel array 110 through the first to n-th column lines CL1 to CLn, respectively (e.g., n being a positive integer). The analog-to-digital conversion circuit 150 may include first to n-th analog-to-digital converters AD1 to ADn corresponding to the first to n-th column lines CL1 to CLn, respectively. The first to n-th analog-to-digital converters AD1 to ADn may receive the pixel signals and the ramp signals RS from the attenuation circuit 140 in common.

The first to n-th analog-to-digital converters AD1 to ADn may compare the pixel signals (e.g., voltages or currents) of the first to n-th column lines CL1 to CLn passing through the attenuation circuit 140 with the ramp signals RS passing through the attenuation circuit 140. The ramp signals RS may refer to signals that decrease (or increase) at a given rate. The first to n-th analog-to-digital converters AD1 to ADn may latch count values until the ramp signals RS are smaller (or greater) than the pixel signals (e.g., voltages or currents) of the first to n-th column lines CL1 to CLn and may convert and output the latched count values into digital values. For example, the first to n-th analog-to-digital converters AD1 to ADn may output digital values corresponding to the magnitudes (or amounts) of the pixel signals passing through the attenuation circuit 140.

Each of the first to n-th analog-to-digital converters AD1 to ADn may include at least two sub-converters. The sub-converters may be connected in common to the corresponding column line and may receive the ramp signal RS in common. Resolutions of the sub-converters may be equal or different. The sub-converters may be activated at different timings to convert a voltage (or current) of the corresponding column line into digital values (or digital signals). For example, a first sub-converter may be activated at a time t1, and a second sub-converter may be activated at a time t2 different from t1.

The memory circuit 160 may include first to n-th memories M1 to Mn respectively corresponding to the first to n-th analog-to-digital converters AD1 to ADn. The first to n-th memories M1 to Mn may store the digital values (or digital signals) received from the first to n-th analog-to-digital converters AD1 to ADn and may output the stored values (or signals) to an external device.

The control circuit 170 may control one or more operations of the image sensor 100 including timings at which the image sensor 100 operates. The control circuit 170 may control timings at which the row driver 120 sequentially selects the first to m-th row lines RL1 to RLm and may control timings at which signals are transferred through two or more lines included in a row line selected from the first to m-th row lines RL1 to RLm.

The control circuit 170 may control timings when the ramp signal generator 130 generates the ramp signal RS and initializes the ramp signal RS. The control circuit 170 may control timings at which the first to n-th analog-to-digital converters AD1 to ADn start a count operation and a comparison operation and may control timings at which the first to n-th analog-to-digital converters AD1 to ADn are initialized.

The control circuit 170 may perform a compensation operation on the values (or digital signals) stored in the memory circuit 160. For example, the compensation operation may be performed to compensate for offsets caused by components (e.g., the analog-to-digital conversion circuit 150) of the image sensor 100. Furthermore, the control circuit 170 may perform at least one or more compensation operations or one or more correction operations configured to be performed by an image signal processor (ISP).

FIG. 2 illustrates an example of an analog-to-digital converter AD and the first attenuator A1 and the second attenuator A2 corresponding to the one analog-to-digital converter AD according to one or more embodiments. Referring to FIGS. 1 and 2, the analog-to-digital converter AD may be one of the first to n-th analog-to-digital converters AD1 to ADn of the analog-to-digital conversion circuit 150 of FIG. 1. The first attenuator A1 may be one corresponding to the analog-to-digital converter AD from among the first attenuators A1 of the attenuation circuit 140 of FIG. 1. The second attenuator A2 may correspond to the analog-to-digital converter AD from among the second attenuators A2 of the attenuation circuit 140 of FIG. 1.

The first attenuator A1 may receive a pixel signal PXS from the corresponding column line among the first to n-th column lines CL1 to CLn. The first attenuator A1 may adjust an attenuation rate in response to a first control signal CS1 received from the control circuit 170.

The second attenuator A2 may receive the ramp signal RS from the ramp signal generator 130. The second attenuator A2 may adjust an attenuation rate in response to a second control signal CS2 received from the control circuit 170.

The analog-to-digital converter AD may receive the pixel signal PXS passing through the first attenuator A1 and the ramp signal RS passing through the second attenuator A2. The analog-to-digital converter AD may include a comparator CMP and a counter CNT.

The comparator CMP may compare the pixel signal PXS passing through the first attenuator A1 and the ramp signal RS passing through the second attenuator A2. When the level of the pixel signal PXS passing through the first attenuator A1 is higher (or lower) than the level of the ramp signal RS passing through the second attenuator A2, the comparator CMP may invert and output an initial output level (e.g., a high level to a low level or a low level to a high level). The comparator CMP may perform comparison in response to a third control signal CS3 output from the control circuit 170.

The comparator CMP may include an operational transconductance amplifier (OTA) that compares the level of the pixel signal PXS passing through the first attenuator A1 and the level of the ramp signal RS passing through the second attenuator A2 and outputs a comparison result by using a current. The high level or the low level that is output from the comparator CMP may be interpreted as a direction in which the output current flows.

The comparator CMP may include a first stage circuit SCT1 and a second stage circuit SCT2. For example, the first stage circuit SCT1 may compare the level of the pixel signal PXS passing through the first attenuator A1 and the level of the ramp signal RS passing through the second attenuator A2 and may output a comparison result by using a voltage. The second stage circuit SCT2 may output a current in response to the voltage output from the first stage circuit SCT1.

The counter CNT may start a count operation in response to a fourth control signal CS4 received from the control circuit 170. The control signal may be received after resetting a count value. When the output level of the comparator CMP (e.g., a direction in which a current flows) is inverted, the counter CNT may stop the count operation and may output the count value as a digital value DV.

Figure 3:
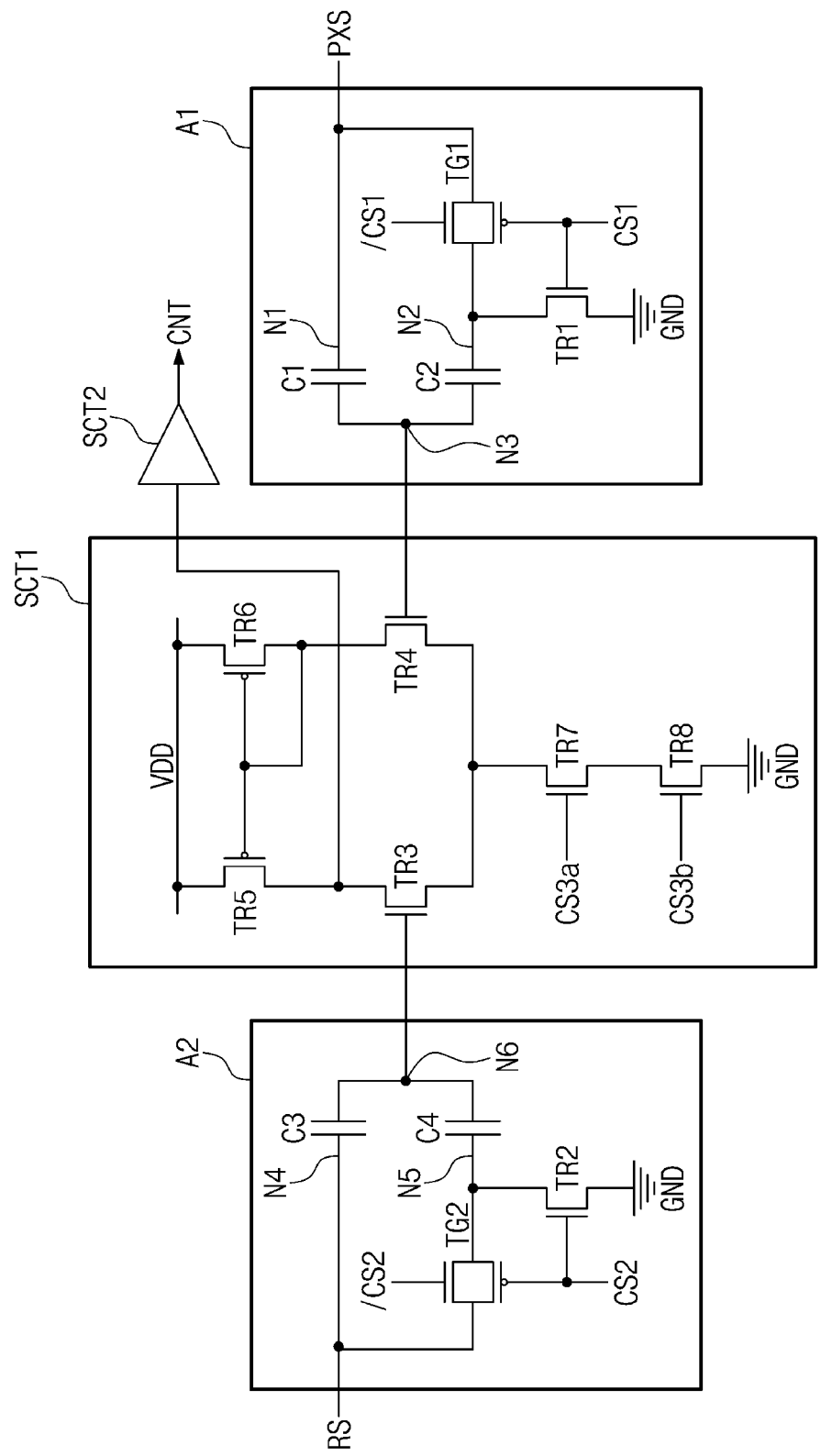
FIG. 3 illustrates a circuit diagram of a first attenuator, a second attenuator, and a first stage circuit and a second stage circuit of a comparator as an example according to one or more embodiments.

FIG. 3 illustrates a circuit diagram of the first attenuator A1, the second attenuator A2, and the first stage circuit SCT1 and the second stage circuit SCT2 of the comparator CMP as an example. Referring to FIGS. 1, 2, and 3, the first attenuator A1 may include a first capacitor C1, a second capacitor C2, a first transistor TR1, and a first transmission gate TG1.

The first capacitor C1 may be connected between a first node N1 and a third node N3. The first node N1 may be connected to a column line through which the pixel signal PXS is received. The second capacitor C2 may be connected between a second node N2 and the third node N3. A capacitance of the first capacitor C1 may be identical to or different from a capacitance of the second capacitor C2.

The first transistor TR1 may include a gate to which the first control signal CS1 is input, a first terminal connected to the second node N2, and a second terminal connected to a ground node to which a ground voltage GND is applied.

The first transmission gate TG1 may be connected between the second node N2 and the column line through which the pixel signal PXS is received. In response to the first transmission gate TG1 and an inverted signal/CS1 of the first control signal CS1, the first transmission gate TG1 may electrically connect the second node N2 and the column line or may electrically disconnect the second node N2 from the column line. The first transmission gate TG1 may include a PMOS transistor operating in response to the first control signal CS1 and an NMOS transistor operating in response to the inverted signal/CS1 of the first control signal CS1.

The third node N3 of the first attenuator A1 may be connected to a first input of the first stage circuit SCT1 (e.g., a first input of the analog-to-digital converter AD). When the first control signal CS1 is at the high level, the first transistor TR1 may be turned on, and the first transmission gate TG1 may be turned off. The change of the pixel signal PXS may be divided by the first capacitor C1 and the second capacitor C2 and may be propagated to the first stage circuit SCT1. For example, the pixel signal PXS may be attenuated.

When the first control signal CS1 is at the low level, the first transistor TR1 may be turned off, and the first transmission gate TG1 may be turned on. The change of the pixel signal PXS may be propagated to the first stage circuit SCT1 through the first capacitor C1 and the second capacitor C2. For example, the pixel signal PXS may not be attenuated.

The second attenuator A2 may include a third capacitor C3, a fourth capacitor C4, a second transistor TR2, and a second transmission gate TG2.

The third capacitor C3 may be connected between a fourth node N4 and a sixth node N6. The fourth node N4 may be connected to a conductive line through which the ramp signal RS is received. The fourth capacitor C4 may be connected between a fifth node N5 and the sixth node N6. A capacitance of the third capacitor C3 may be identical to or different from a capacitance of the fourth capacitor C4.

The second transistor TR2 may include a gate to which the second control signal CS2 is input, a first terminal connected to the fifth node N5, and a second terminal connected to the ground node to which the ground voltage GND is applied.

The second transmission gate TG2 may be connected between the fifth node N5 and the conductive line through which the ramp signal RS is received. In response to the second control signal CS2 and an inverted signal/CS2 of the second control signal CS2, the second transmission gate TG2 may electrically connect the fifth node N5 and the conductive line or may electrically disconnect the fifth node N5 from the conductive line. The second transmission gate TG2 may include a PMOS transistor operating in response to the second control signal CS2 and an NMOS transistor operating in response to the inverted signal/CS2 of the second control signal CS2.

The sixth node N6 of the second attenuator A2 may be connected to a second input of the first stage circuit SCT1 (e.g., a second input of the analog-to-digital converter AD). When the second control signal CS2 is at the high level, the second transistor TR2 may be turned on, and the second transmission gate TG2 may be turned off. The change of the ramp signal RS may be divided by the third capacitor C3 and the fourth capacitor C4 and may be propagated to the first stage circuit SCT1. That is, the ramp signal RS may be attenuated.

When the second control signal CS2 is at the low level, the second transistor TR2 may be turned off, and the second transmission gate TG2 may be turned on. The change of the ramp signal RS may be transferred to the first stage circuit SCT1 through the third capacitor C3 and the fourth capacitor C4. That is, the ramp signal RS may not be attenuated.

The control circuit 170 may control the first control signal CS1 (and the inverted signal/CS1 of the first control signal CS1) and the second control signal CS2 (and the inverted signal/CS2 of the second control signal CS2) depending on an operating mode set by an external device. For example, in the operation mode of a bright environment where the amount of ambient light is higher than a threshold value, the control circuit 170 may control the first attenuator A1 and the second attenuator A2 such that the pixel signal PXS and the ramp signal RS are attenuated. In the operation mode of a dark environment where the amount of ambient light is lower than or equal to the threshold value, the control circuit 170 may control the first attenuator A1 and the second attenuator A2 such that the pixel signal PXS and the ramp signal RS may be propagated without attenuation.

Before resetting the pixels PX connected to a selected row line among the first to m-th row lines RL1 to RLm (e.g., before performing the shutter operation) and before the analog-to-digital converter AD generates the digital value DV from the pixels signal PXS, the control circuit 170 may determine the level of the first control signal CS1 and the level of the second control signal CS2.

The first stage circuit SCT1 may receive a signal corresponding to the pixel signal PXS from the first attenuator A1 and may receive a signal corresponding to the ramp signal RS from the second attenuator A2. The first stage circuit SCT1 may include a third transistor TR3, a fourth transistor TR4, a fifth transistor TR5, a sixth transistor TR6, a seventh transistor TR7, and an eighth transistor TR8.

The third transistor TR3 may include a gate of receiving the signal corresponding to the ramp signal RS from the second attenuator A2, a first terminal connected to the fifth transistor TR5 and the second stage circuit SCT2, and a second terminal connected to the fourth transistor TR4 and the seventh transistor TR7.

The fourth transistor TR4 may include a gate of receiving the signal corresponding to the pixel signal PXS from the first attenuator A1, a first terminal connected to the sixth transistor TR6, and a second terminal connected to the third transistor TR3 and the seventh transistor TR7.

The fifth transistor TR5 may include a gate connected to the sixth transistor TR6, a first terminal connected to a power node to which a power supply voltage VDD is applied, and a second terminal connected to the third transistor TR3 and the second stage circuit SCT2.

The sixth transistor TR6 may include a gate connected to the fifth transistor TR5, a first terminal connected to the power node, and a second terminal connected to the fourth transistor TR4. The gate and the second terminal of the sixth transistor TR6 may be electrically connected.

The seventh transistor TR7 may include a gate to which a 3a-th control signal CS3a, a first terminal connected to the third transistor TR3 and the fourth transistor TR4, and a second terminal connected to the eighth transistor TR8.

The eighth transistor TR8 may include a gate to which a 3b-th control signal CS3b is applied, a first terminal connected to the seventh transistor TR7, and a second terminal connected to the ground node.

The 3a-th control signal CS3a and the 3b-th control signal CS3b may be included in the third control signal CS3.

The second stage circuit SCT2 may output a current corresponding to a level of a voltage of a node between the third transistor TR3 and the fifth transistor TR5 to the counter CNT. For example, the second stage circuit SCT2 may output a current of a forward direction in which a current flows to the counter CNT or may output a current of a backward direction in which a current is sunk from the counter CNT.

Figure 4:
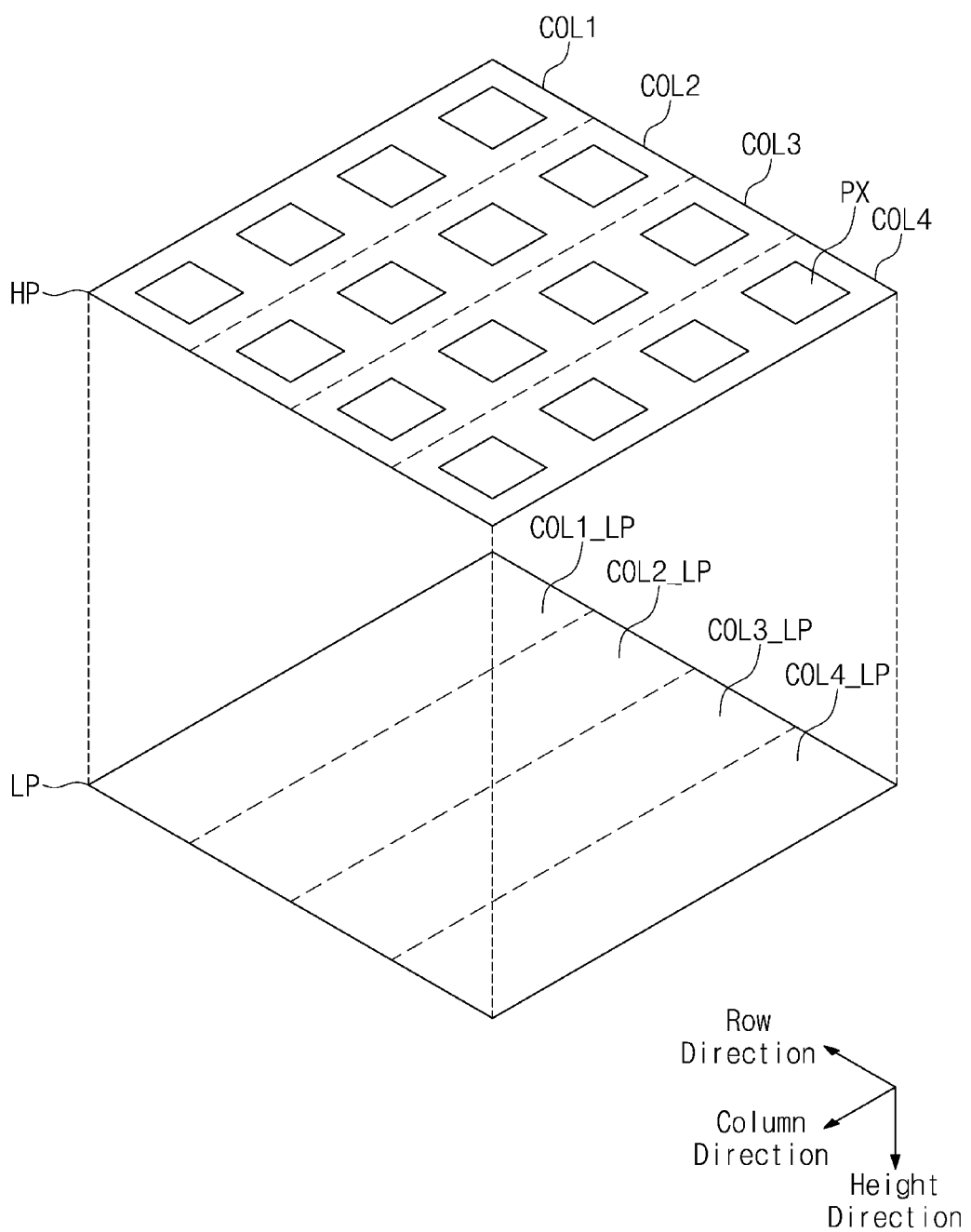
FIG. 4 is a diagram illustrating an example where a high plate and a low plate of an image sensor according to one or more embodiments.

FIG. 4 illustrates an example of a high plate HP and a low plate LP of the image sensor 100 according to one or more embodiments. Referring to FIGS. 1, 2, 3, and 4, the image sensor 100 may be implemented by manufacturing the high plate HP and the low plate LP and coupling the high plate HP and the low plate LP.

The high plate HP and the low plate LP may be manufactured by using different wafers. For example, a first wafer may be used for the high plate HP and a second wafer may be used for the low plate LP. In one or more embodiments, after the low plate LP is manufactured on a wafer, the low plate LP may be turned over and may be coupled to the high plate HP. For example, after the low plate LP is manufactured, the low plate LP may be rotated 180 degrees around the column direction and may be coupled to the high plate HP. In FIG. 4, the row direction, the column direction, and the height direction may be depicted based on the low plate LP.

The high plate HP may be manufactured to include the pixel array 110. For example, examples of pixels PX disposed at a first column COL1, a second column COL2, a third column COL3, and a fourth column COL4 of the high plate HP are illustrated in FIG. 4.

The low plate LP may be manufactured to include the ramp signal generator (RSG) 130, the attenuation circuit 140, the analog-to-digital conversion circuit 150, the memory circuit 160, and the control circuit 170. Among the components of the low plate LP, the first attenuators A1 and the second attenuators A2 of the attenuation circuit 140 and the first to n-th analog-to-digital converters AD1 to ADn of the analog-to-digital conversion circuit 150 are manufactured as much as the number of columns of the pixels PX in the high plate HP.

Because the number of columns of pixels, the number of first attenuators A1, the number of second attenuators A2, and the number of first to n-th analog-to-digital converters AD1 to ADn are equal, to manufacture the size of the low plate LP and the size of the high plate HP equally, the first attenuator A1, the second attenuator A2, and one analog-to-digital converter AD may be disposed between guard rings having a pitch corresponding to the size of a pixel form the pixels PX of the high plate HP.

In one or more embodiments, the first attenuator A1, the second attenuator A2, and the analog-to-digital converter AD may be disposed at a first column COL1_LP of the low plate LP, so as to correspond to the size of a pixel from the pixels PX of the first column COL1 in the high plate HP. In one or more examples, the first attenuator A1, the second attenuator A2, and the analog-to-digital converter AD may be disposed at each of a second column COL2_LP, a third column COL3_LP, and a fourth column COL4_LP of the low plate LP, so as to correspond to the size of a pixel from the pixels PX of each of the second column COL2, the third column COL3, and the fourth column COL4 in the high plate HP.

In one or more examples, as the size of a pixel from the pixels PX of the high plate HP becomes finer (e.g., smaller in width or length), the pitch allowable in each column area of the low plate LP also decreases. As the pitch of each column area decreases, transistors of each column area may be manufactured by using the ultra-fine semiconductor process, or any other suitable process known to one of ordinary skill in the art. For example, transistors of the first attenuator A1, the second attenuator A2, and the analog-to-digital converter AD may be designed and manufactured by using the FINFET process (or a GAA (Gate-All-Around) process or a nano sheet process).

As the transistors of each column area are manufactured by using the ultra-fine semiconductor process, the first capacitor C1 and the second capacitor C2 of the first attenuator A1 and the third capacitor C3 and the fourth capacitor C4 of the second attenuator A2 may also be manufactured by using the ultra-fine semiconductor process, or any other suitable process known to one of ordinary skill in the art. A capacitance of a capacitor manufactured based on the ultra-fine semiconductor process may be smaller than a capacitance of a capacitor manufactured based on the legacy semiconductor process. When the capacitance of the capacitor decreases, the influence of parasitic capacitances caused around the capacitor may increase. The influence of the parasitic capacitances may appear as a noise in the pixel signal PXS passing through the first capacitor C1 and the second capacitor C2 of the first attenuator A1 and the ramp signal RS passing through the third capacitor C3 and the fourth capacitor C4 of the second attenuator A2, thereby causing signal deterioration.

To solve the above issue, the image sensor 100 according to one or more embodiments of the present disclosure may generate an image signal having a reduced noise by reducing the influence of parasitic capacitances, where the image signal with reduced noise is propagated to capacitors.

Figure 5:
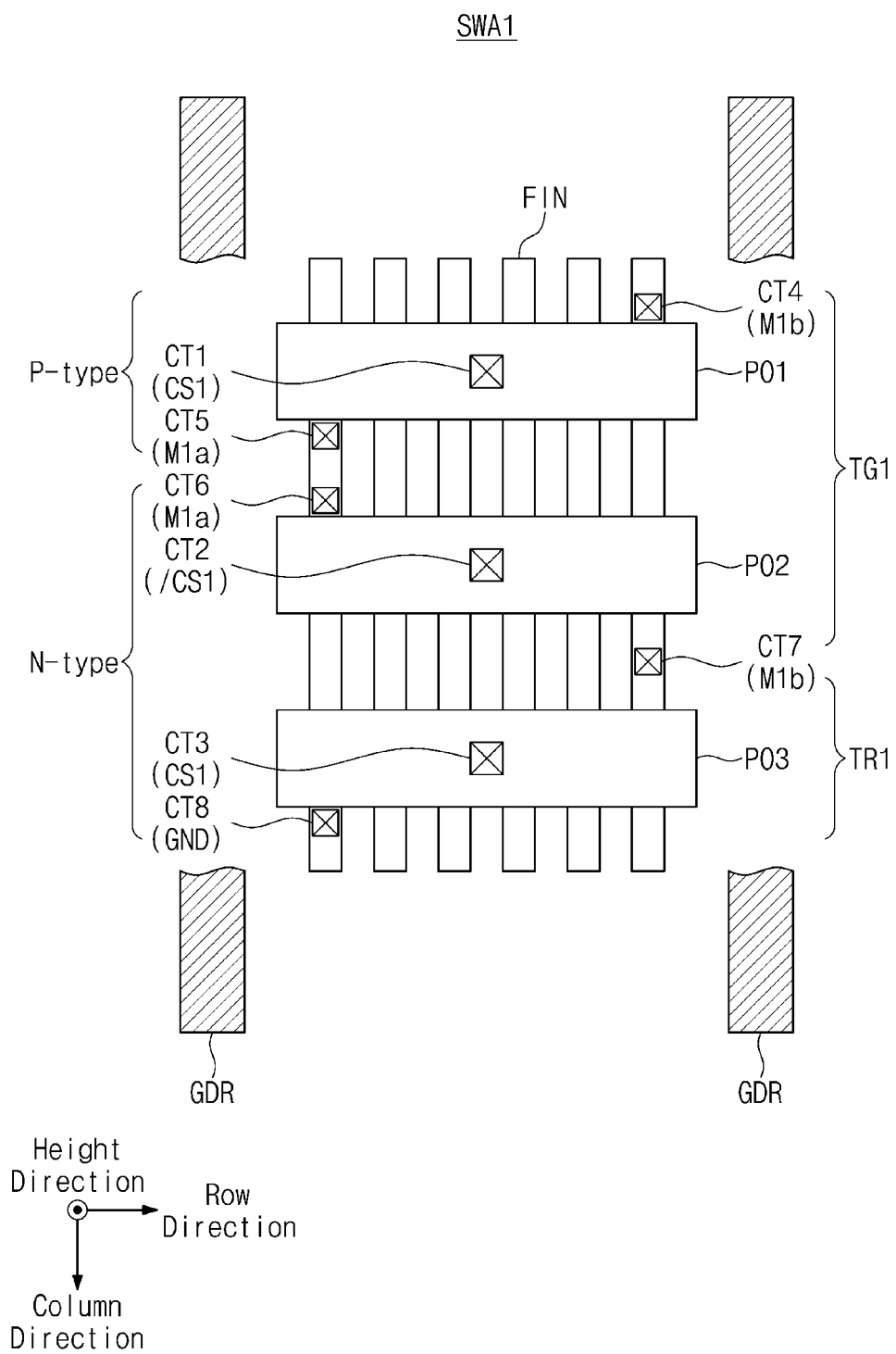
FIG. 5 illustrates a first switch area according to one or more embodiments of the present disclosure.

FIG. 5 illustrates a first switch area SWA1 according to one or more embodiments of the present disclosure. The first switch area SWA1 may correspond to the first transistor TR1 and the first transmission gate TG1 of the first attenuator A1. Referring to FIGS. 1, 3, and 5, the first switch area SWA1 may be between two guard rings GDR extending in the column direction parallel to each other. The pitch between the two guard rings GDR may correspond to the size of a pixel from the pixels PX.

A plurality of fins FIN that extend in the column direction parallel to each other may be provided between the two guard rings GDR. The plurality of fins FIN may protrude in the height direction. A first poly pattern PO1, a second poly pattern PO2, and a third poly pattern PO3 that extend in the row direction perpendicular to the column direction may be provided on the plurality of fins FIN.

The first poly pattern PO1 may correspond to a P-type transistor of the first transmission gate TG1. The fins FIN of a first source/drain region and a second source/drain region of the P-type transistor of the first transmission gate TG1, which are adjacent to the first poly pattern PO1, may be doped to have a P-type conductivity. The fins FIN under the first poly pattern PO1, for example, fins of a channel region may be doped to have an N-type conductivity. An insulating layer may be provided between the first poly pattern PO1 and the fins FIN.

The first poly pattern PO1 may be connected to a first contact CT1. The first poly pattern PO1 may receive the first control signal CS1 through the first contact CT1. The first source/drain region of the P-type transistor of the first transmission gate TG1 may be connected to a fourth contact CT4. The fourth contact CT4 may be connected to a conductive material provided in a first metal layer being the lowest, for example, a 1b-th metal wire M1b. The second source/drain region of the P-type transistor of the first transmission gate TG1 may be connected to a fifth contact CT5. The fifth contact CT5 may be connected to a conductive material provided in the first metal layer being the lowest, for example, a 1a-th metal wire M1a.

The second poly pattern PO2 may correspond to an N-type transistor of the first transmission gate TG1. The fins FIN of a first source/drain region and a second source/drain region of the N-type transistor of the first transmission gate TG1, which are adjacent to the second poly pattern PO2, may be doped to have an N-type conductivity. The fins FIN under the second poly pattern PO2, for example, fins of a channel region may be doped to have a P-type conductivity. An insulating layer may be provided between the second poly pattern PO2 and the fins FIN.

The second poly pattern PO2 may be connected to a second contact CT2. The second poly pattern PO2 may receive the inverted signal /CS1 of the first control signal CS1 through the second contact CT2. The first source/drain region of the N-type transistor of the first transmission gate TG1 may be connected to a sixth contact CT6. The sixth contact CT6 may be connected to the conductive material provided in the first metal layer being the lowest, for example, the 1a-th metal wire M1a. The second source/drain region of the N-type transistor of the first transmission gate TG1 may be connected to a seventh contact CT7. The seventh contact CT7 may be connected to the conductive material provided in the first metal layer being the lowest, for example, the 1b-th metal wire M1b.

The third poly pattern PO3 may correspond to the first transistor TR1. The fins FIN of a first source/drain region and a second source/drain region of the first transistor TR1, which are adjacent to the third poly pattern PO3, may be doped to have an N-type conductivity. The fins FIN under the third poly pattern PO3, for example, fins of a channel region may be doped to have a P-type conductivity. An insulating layer may be provided between the third poly pattern PO3 and the fins FIN.

The third poly pattern PO3 may be connected to a third contact CT3. The third poly pattern PO3 may receive the first control signal CS1 through the third contact CT3. The first source/drain region common of the first transistor TR1 may be connected in common to the seventh contact CT7 together with the second source/drain region of the N-type transistor of the first transmission gate TG1. The seventh contact CT7 may be connected to the conductive material provided in the first metal layer being the lowest, for example, the 1b-th metal wire M1b. The second source/drain region of the first transistor TR1 may be connected to an eighth contact CT8. The eighth contact CT8 may be connected to a power line through which the ground voltage GND is supplied.

The locations of the first to eighth contacts CT1 to CT8, as discussed above, are merely an example. As understood by one of ordinary skill in the art, the locations of the first to eighth contacts CT1 to CT8 may be modified to be different from those illustrated in FIG. 5.

Figure 6:
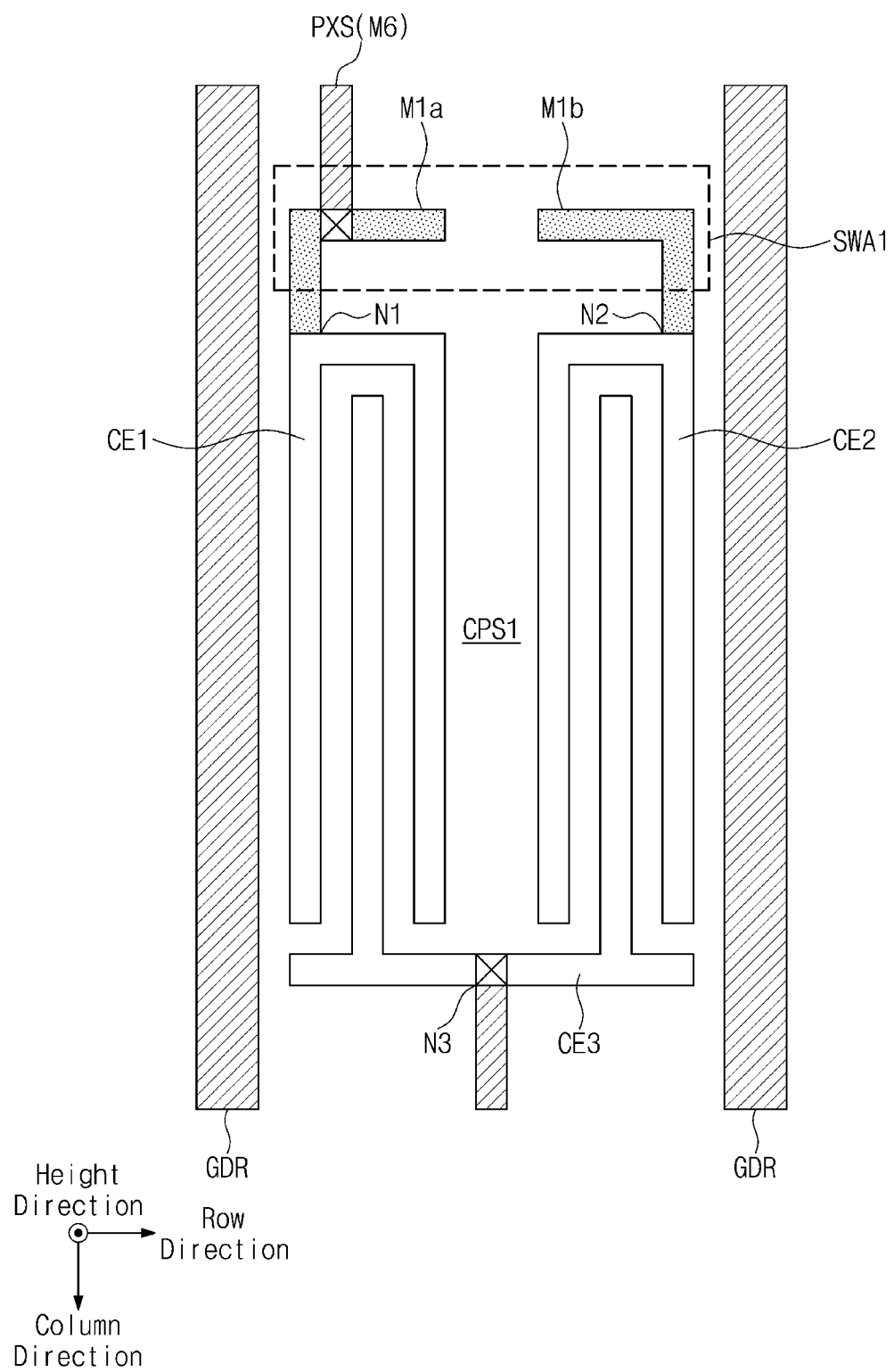
FIG. 6 illustrates an example of a first capacitor structure corresponding to a first capacitor and a second capacitor of a first attenuator according to one or more embodiments.

FIG. 6 illustrates an example of a first capacitor structure CPS1 corresponding to the first capacitor C1 and the second capacitor C2 of the first attenuator A1. Referring to FIGS. 1, 3, 5, and 6, the first capacitor structure CPS1 may be provided between the two guard rings GDR. The pitch between the two guard rings GDR may correspond to the size of a pixel from the pixels PX.

In one or more examples, the first capacitor structure CPS1 may include a first capacitor element CE1, a second capacitor element CE2, and a third capacitor element CE3.

The first capacitor element CE1 may include a first conductive material extending in the row direction and at least two first conductive fingers extending from the first conductive material in parallel along the column direction. In one or more embodiments, the first capacitor element CE1 may be provided in at least two metal layers. For example, the first capacitor element CE1 may be provided in a first metal layer being the lowest of the at least two metal layers, a second metal layer higher than the first metal layer, a third metal layer higher than the second metal layer, and a fourth metal layer higher than the third metal layer.

Patterns (or wires) of the first metal layer of the first capacitor element CE1 may extend to the first switch area SWA1 to form the 1a-th metal wire M1a. The 1a-th metal wire M1a may be connected to the fifth contact CT5 and the sixth contact CT6 in the first switch area SWA1. Furthermore, the 1a-th metal wire M1a may be connected to a pattern (or wire) of a sixth metal layer M6 through a contact. The pattern of the sixth metal layer M6 may extend from the contact along a direction facing away from the column direction. The pattern of the sixth metal layer M6 may transfer the pixel signal PXS to the first capacitor element CE1.

The second capacitor element CE2 may include a second conductive material extending in the row direction and at least two second conductive fingers extending from the second conductive material in parallel along the column direction. In one or more embodiments, the second capacitor element CE2 may be provided in at least two metal layers. For example, the second capacitor element CE2 may be provided in the first metal layer being the lowest of the at least two metal layers, the second metal layer higher than the first metal layer, the third metal layer higher than the second metal layer, and the fourth metal layer higher than the third metal layer.

Patterns (or wires) of the first metal layer of the second capacitor element CE2 may extend to the first switch area SWA1 to form the 1b-th metal wire M1b. The 1b-th metal wire M1b may be connected to the fourth contact CT4 and the seventh contact CT7 in the first switch area SWA1.

The third capacitor element CE3 may include a third conductive material extending in the row direction and at least two third conductive fingers extending from the third conductive material in parallel to each other along the column direction. In one or more embodiments, the third capacitor element CE3 may be provided in at least two metal layers. For example, the third capacitor element CE3 may be provided in the first metal layer being the lowest of the at least two metal layers, the second metal layer higher than the first metal layer, the third metal layer higher than the second metal layer, and the fourth metal layer higher than the third metal layer.

One of the at least two third conductive fingers of the third capacitor element CE3 may extend between the at least two first conductive fingers of the first capacitor element CE1 in the direction facing away from the column direction. The other of the at least two third conductive fingers of the third capacitor element CE3 may extend between the at least two second conductive fingers of the second capacitor element CE2 in the direction facing away from the column direction.

Patterns (or wires) of the fourth metal layer of the third capacitor element CE3 may be connected to a pattern (or wire) of the sixth metal layer M6 through a contact. A point (or contact) where the connection with the pattern (or wire) of the sixth metal layer M6 is made may correspond to the third node N3. The wire of the sixth metal layer M6 connected to the third node N3 may extend along the column direction and may be connected to the first input of the first stage circuit SCT1.

Figure 7A:
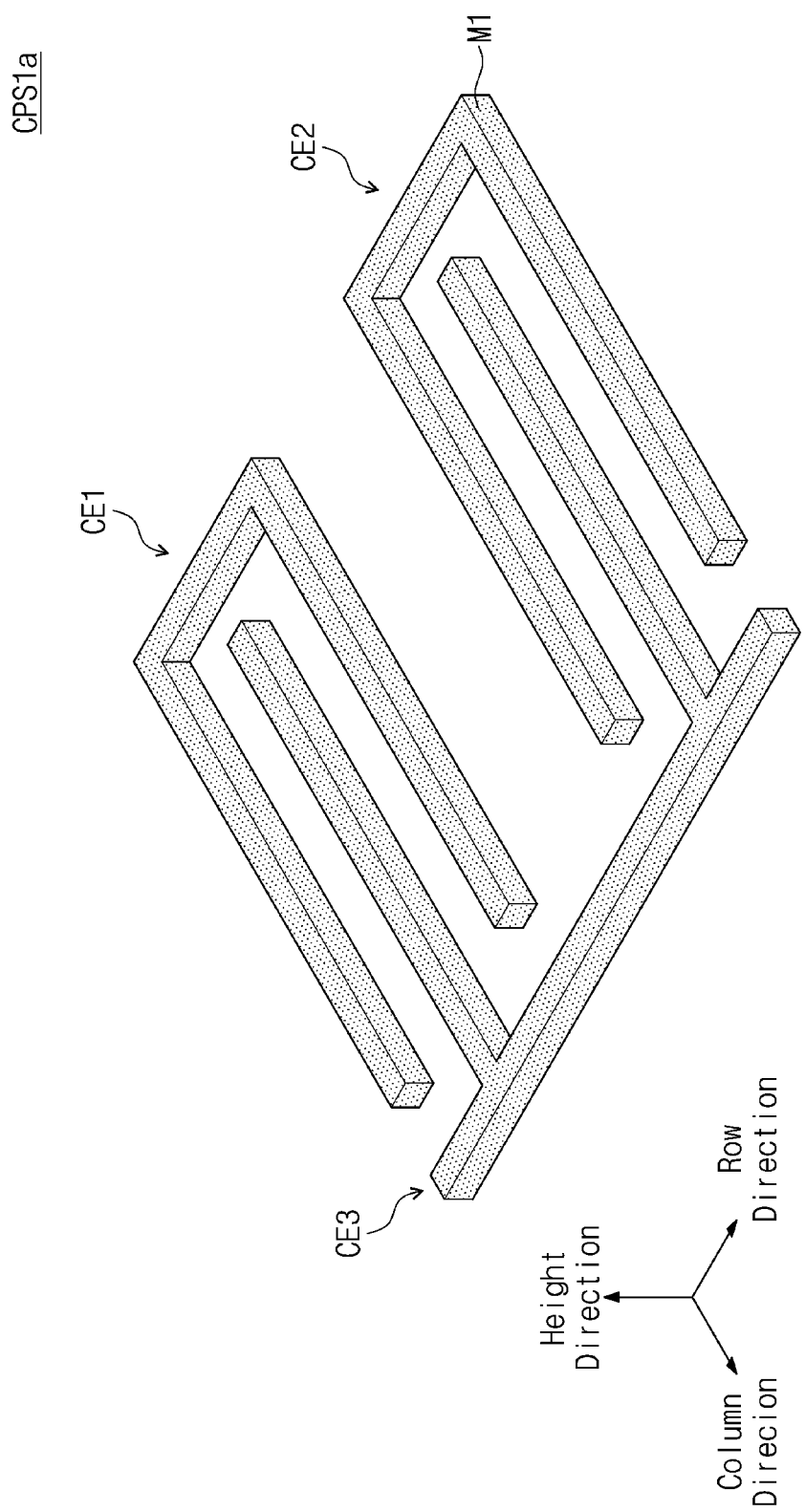
FIGS. 7A, 7B, and 7C illustrate examples in which a first capacitor structure is stacked in metal layers according to one or more embodiments.
Figure 7B:
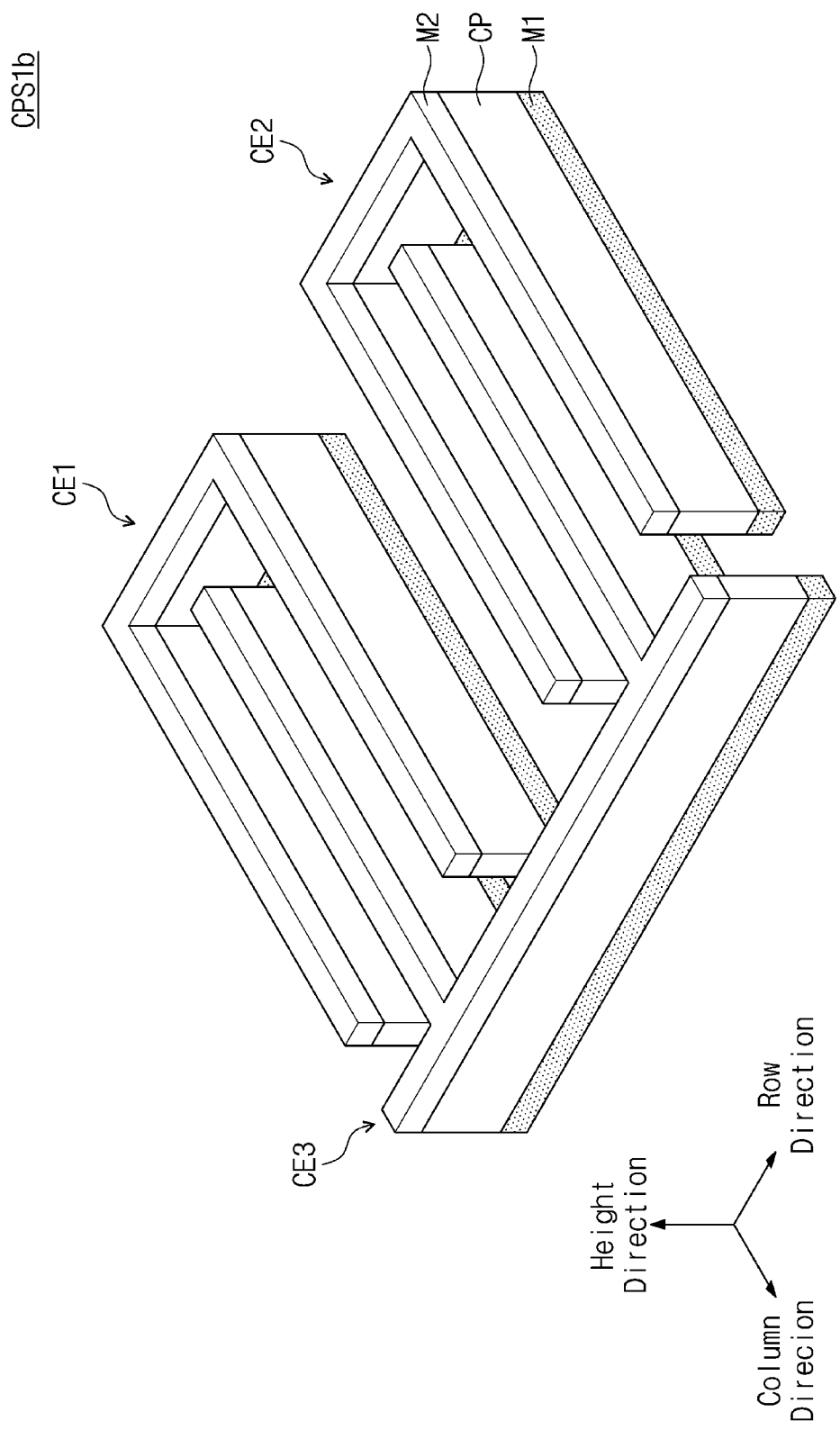
Figure 7C:
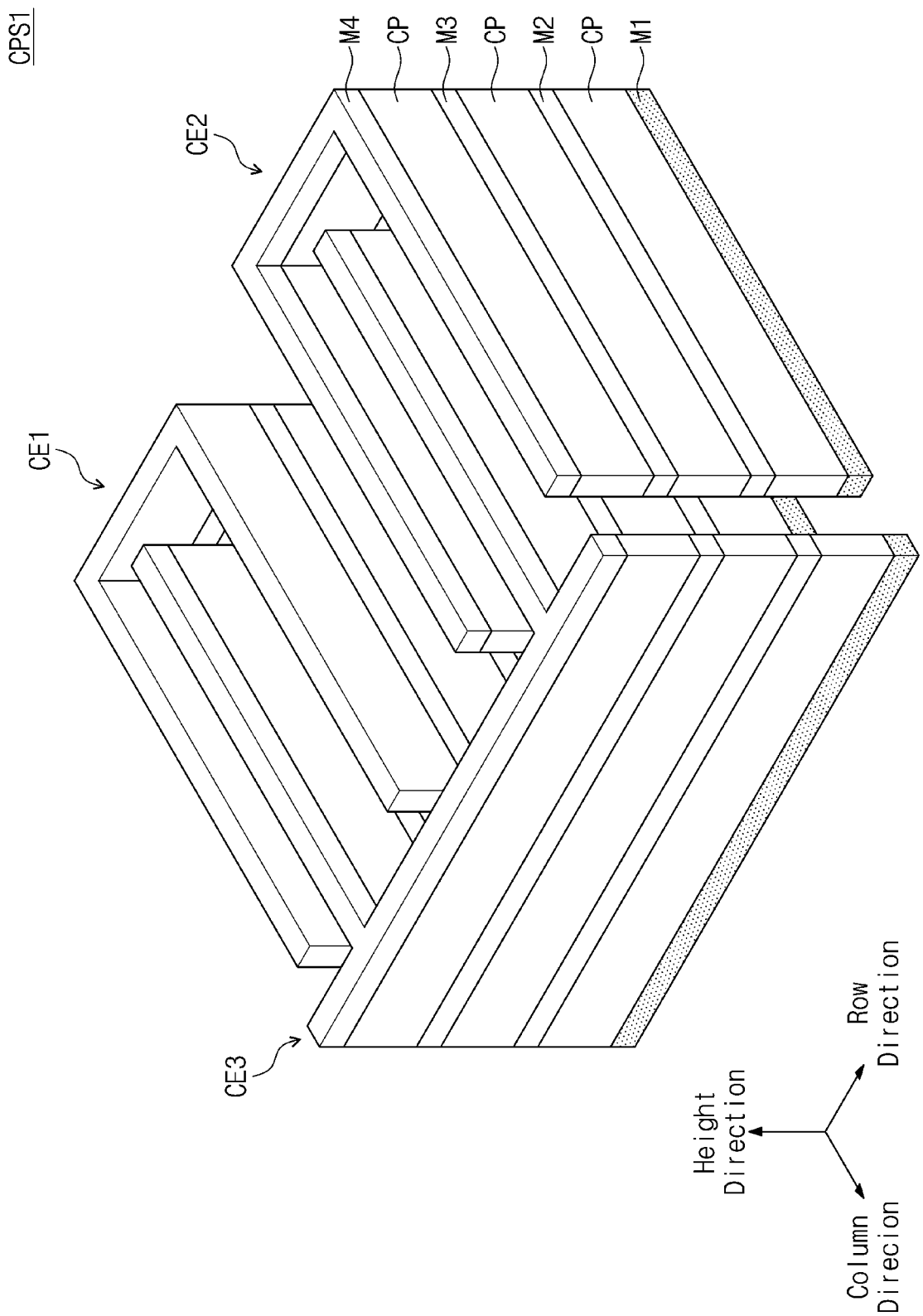

FIGS. 7A, 7B, and 7C illustrate examples in which the first capacitor structure CPS1 is stacked in metal layers according to one or more embodiments. The first capacitor structure CPS1 may be stacked according to an order of the intermediate capacitor structures CPS1a of FIG. 7A and CPS1b of FIG. 7B. Referring to FIGS. 1, 6, and 7A, the first conductive material and the at least two first conductive fingers of the first capacitor element CE1, the second conductive material and the at least two second conductive fingers of the second capacitor element CE2, and the third conductive material and the at least two third conductive fingers of the third capacitor element CE3 may be provided in a first metal layer M1. The first, second, and third conductive materials may be formed of the same material, or at least one of the first, second, and third conductive materials may be different from the other two conductive materials.

Referring to FIGS. 1, 6, and 7B, contact plates CP may be provided on the patterns of the first metal layer M1. The contact plates CP may be longitudinal plates having the same shapes as the patterns of the first capacitor structure CPS1 provided in the first metal layer M1. Patterns having the same shapes as the patterns of the first capacitor structure CPS1 provided in the first metal layer M1 may be provided in a second metal layer M2 on the contact plate CP. The contact plates CP may connect the patterns of the first metal layer M1 and the patterns of the second metal layer M2 vertically (e.g., in the height direction).

Referring to FIGS. 1, 6, and 7C, patterns having the same shapes as the patterns of the first capacitor structure CPS1 provided in the first metal layer M1 may be provided in a third metal layer M3 and a fourth metal layer M4. The patterns of the third metal layer M3 may be connected to the patterns of the second metal layer M2 through contact plates CP. The patterns of the fourth metal layer M4 may be connected to the patterns of the third metal layer M3 through the contact plates CP. The contact plates CP illustrated in FIG. 7C may each formed of the same material, or at least one contact plate may be formed of a different material than the other contact plates.

As described with reference to FIGS. 7A, 7B, and 7C, the capacitance of the first capacitor structure CPS1 may be increased by vertically connecting the patterns provided in two or more metal layers by using the contact plates CP.

Referring to FIGS. 6, 7A, 7B, and 7C, the first capacitor structure CPS1 may be symmetrical in structure along the row direction between the two guard rings GDR. Distances between the first conductive material of the first capacitor element CE1 and the two guard rings GDR may be equal or substantially equal (e.g., distances within 10% of each other) to distances between the second conductive material of the second capacitor element CE2 and the two guard rings GDR.

Distances between one first conductive finger among the at least two first conductive fingers of the first capacitor element CE1 and the two guard rings GDR may be equal or substantially equal (e.g., distances within 10% of each other) to distances between one second conductive finger corresponding to the one first conductive finger from among the at least two second conductive fingers of the second capacitor element CE2 and the two guard rings GDR. Distances between the remaining first conductive finger among the at least two first conductive fingers of the first capacitor element CE1 and the two guard rings GDR may be equal or substantially equal (e.g., distances within 10% of each other) to distances between the remaining second conductive finger corresponding to the remaining first conductive finger from among the at least two second conductive fingers of the second capacitor element CE2 and the two guard rings GDR.

Distances between one of the at least two third conductive fingers of the third capacitor element CE3 and the at least two first conductive fingers of the first capacitor element CE1 may be equal or substantially equal (e.g., distances within 10% of each other) to distances between the other of the at least two third conductive fingers of the third capacitor element CE3 and the at least two second conductive fingers of the second capacitor element CE2. Distances between one of the at least two third conductive fingers of the third capacitor element CE3 and the two guard rings GDR may be equal or substantially equal (e.g., distances within 10% of each other) to distances between the other of the at least two third conductive fingers of the third capacitor element CE3 and the two guard rings GDR.

Since the first capacitor structure CPS1 is provided to be symmetrical along the row direction between the two guard rings GDR, the parasitic capacitances between the first capacitor element CE1 and the two guard rings GDR may be equal or substantially equal (e.g., capacitances within 10% of each other) to the parasitic capacitances between the second capacitor element CE2 and the two guard rings GDR. Furthermore, the parasitic capacitances between the third capacitor element CE3 and the two guard rings GDR may be formed to be symmetrical along the row direction.

In one or more embodiments, the first capacitor element CE1 and a corresponding portion (e.g., one of the at least two third conductive fingers) of the third capacitor element CE3 may form the first capacitor C1 of the first attenuator A1, and the second capacitor element CE2 and a corresponding portion (e.g., the other of the at least two third conductive fingers) of the third capacitor element CE3 may form the second capacitor C2 of the first attenuator A1.

When the first capacitor structure CPS1 forming the first capacitor C1 and the second capacitor C2 is formed to be symmetrical along the row direction, the parasitic capacitances caused at the first capacitor C1 may be equal or substantially equal (e.g., parasitic capacitances within 10% of each other) to the parasitic capacitances caused at the second capacitor C2. Noises of the same level may be caused at the first capacitor C1 and the second capacitor C2 due to the parasitic capacitances in the first capacitor structure CPS1 and may be mutually cancelled out. Accordingly, the image sensor 100 in which the noise due to parasitic capacitances is advantageously reduced may be provided.

One or more embodiments in which patterns of two or more metal layers of the first capacitor structure CPS1 are vertically connected by using the contact plates CP is illustrated in FIGS. 7A, 7B, and 7C, but via contacts may be provided instead of some of the contact plates CP. For example, the patterns of the two or more metal layers of the first capacitor structure CPS1 may be vertically connected through one or more via contacts and one or more contact plates CP. In one or more embodiments, locations where via contacts are provided and locations where contact plates may be symmetrical along the row direction.

In one or more examples, the patterns of the two or more metal layers of the first capacitor structure CPS1 may be vertically connected through one or more via contacts, not the contact plates CP. In one or more embodiments, locations where via contacts are provided may be symmetrical along the row direction.

Figure 8:
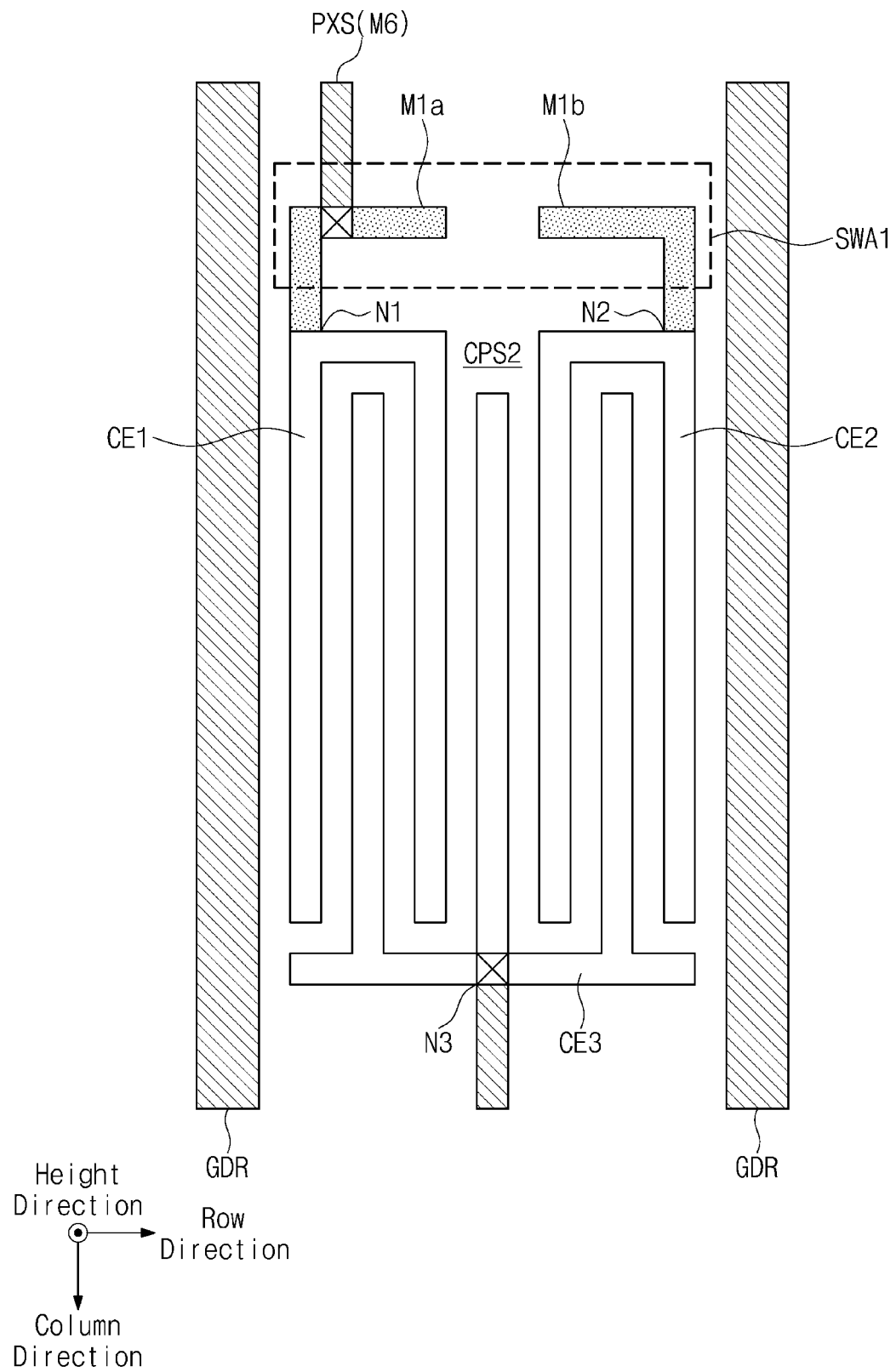
FIG. 8 illustrates an example of a second capacitor structure corresponding to a first capacitor and a second capacitor of a first attenuator according to one or more embodiments.

FIG. 8 illustrates an example of a second capacitor structure CPS2 corresponding to the first capacitor C1 and the second capacitor C2 of the first attenuator A1. Referring to FIGS. 1, 3, 5, and 8, the second capacitor structure CPS2 may be provided between the two guard rings GDR. The pitch between the two guard rings GDR may correspond to the size of a pixel from the pixels PX.

The second capacitor structure CPS2 may include a first capacitor element CE1, a second capacitor element CE2, and a third capacitor element CE3. Compared to the first capacitor structure CPS1 of FIG. 6, the first capacitor element CE1 and the second capacitor element CE2 of the second capacitor structure CPS2 may be identical to the first capacitor element CE1 and the second capacitor element CE2 of the first capacitor structure CPS1.

Compared to the first capacitor structure CPS1 of FIG. 6, the third capacitor element CE3 of the second capacitor structure CPS2 may further include a third conductive finger that is provided in a space between the at least two first conductive fingers of the first capacitor element CE1 and the at least two second conductive fingers of the second capacitor element CE2, and extends from the third conductive material of the third capacitor element CE3 along the direction facing away from the column direction. For example, the third capacitor element CE3 may include at least three third conductive fingers.

Figure 9A:
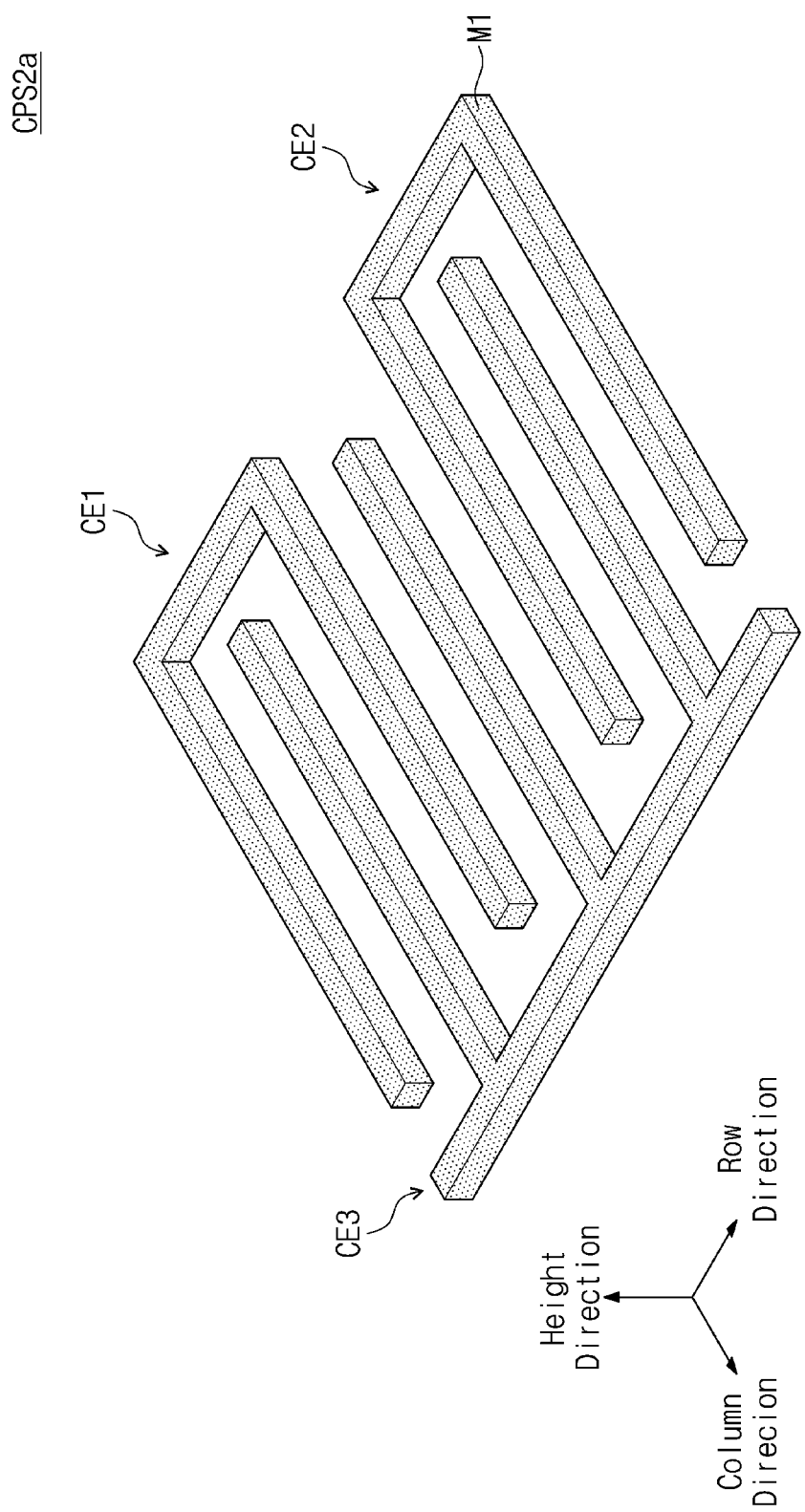
Figure 9B:
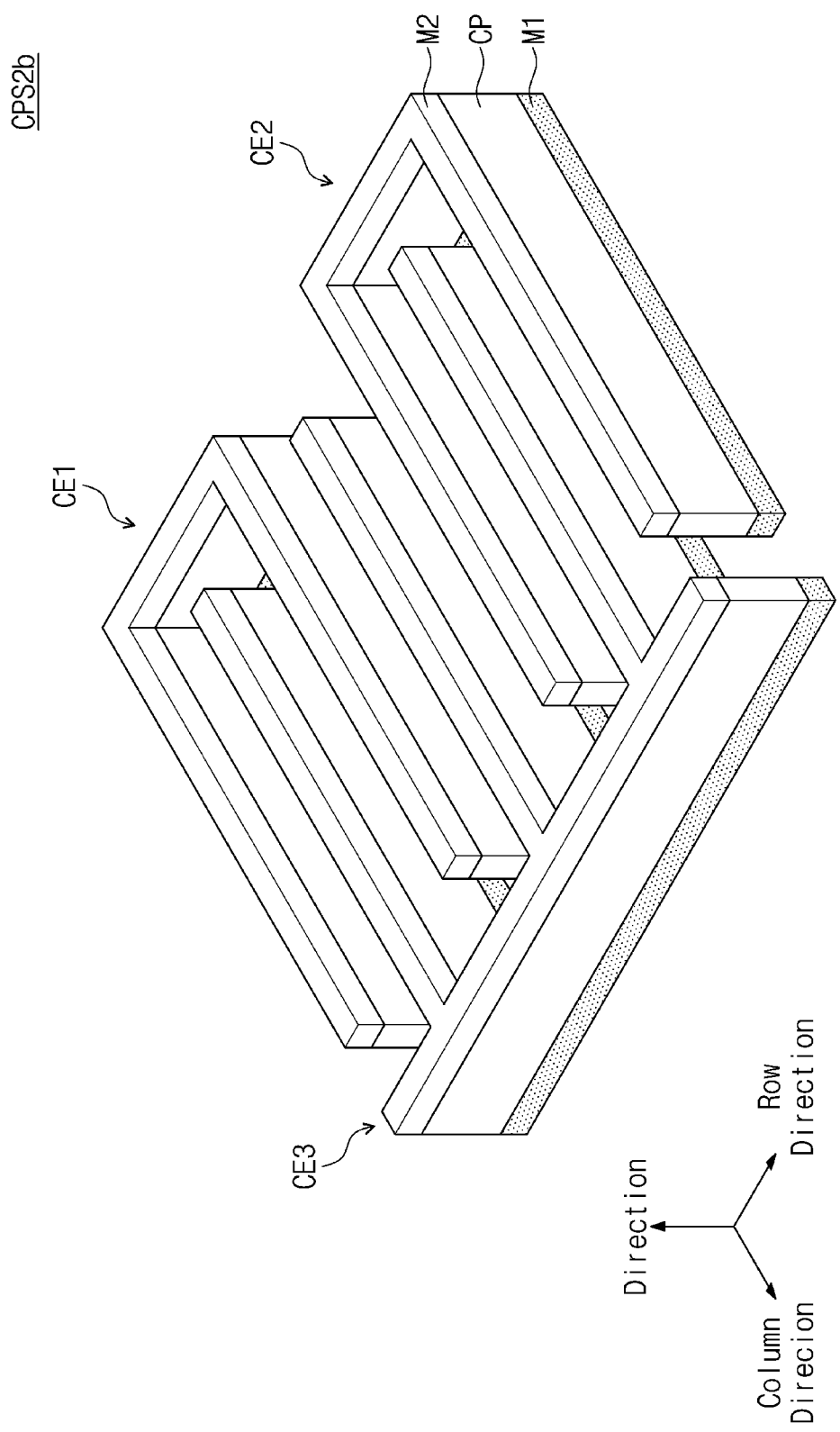

FIGS. 9A, 9B, and 9C illustrate examples in which the second capacitor structure CPS2 is stacked in metal layers. The second capacitor structure CPS2 may be stacked according to an order of the intermediate capacitor structures CPS2$a$ of FIG. 9A and CPS2$b$ of FIG. 9B. Referring to FIGS. 1, 8, and 9A, the first conductive material and the at least two first conductive fingers of the first capacitor element CE1, the second conductive material and the at least two second conductive fingers of the second capacitor element CE2, and the third conductive material and the at least three third conductive fingers of the third capacitor element CE3 may be provided in the first metal layer M1. The first, second, and third conductive materials may be formed of the same material, or at least one of the first, second, and third conductive materials may be different from the other two conductive materials.

Referring to FIGS. 1, 8, and 9B, the contact plates CP may be provided on the patterns of the first metal layer M1. The contact plates CP may be longitudinal plates having the same shapes as the patterns of the second capacitor structure CPS2 provided in the first metal layer M1. Patterns having the same shapes as the patterns of the second capacitor structure CPS2 provided in the first metal layer M1 may be provided in the second metal layer M2 on the contact plate CP. The contact plates CP may connect the patterns of the first metal layer M1 and the patterns of the second metal layer M2 vertically (e.g., in the height direction).

Referring to FIGS. 1, 8, and 9C, patterns having the same shapes as the patterns of the second capacitor structure CPS2 provided in the first metal layer M1 may be provided in the third metal layer M3 and the fourth metal layer M4. The patterns of the third metal layer M3 may be connected to the patterns of the second metal layer M2 through contact plates CP. The patterns of the fourth metal layer M4 may be connected to the patterns of the third metal layer M3 through the contact plates CP. The contact plates CP may be formed of the same material, or at least one contact plate CP may be formed of a different material than the other contact plates.

As described with reference to FIGS. 9A, 9B, and 9C, the capacitance of the second capacitor structure CPS2 may be increased by vertically connecting the patterns provided in two or more metal layers by using the contact plates CP.

Referring to FIGS. 8, 9A, 9B, and 9C, the second capacitor structure CPS2 may be symmetrical in structure along the row direction between the two guard rings GDR. Distances between the first conductive material of the first capacitor element CE1 and the two guard rings GDR may be equal or substantially equal (e.g., distances within 10% of each other) to distances between the second conductive material of the second capacitor element CE2 and the two guard rings GDR.

Distances between one first conductive finger among the at least two first conductive fingers of the first capacitor element CE1 and the two guard rings GDR may be equal or substantially equal (e.g., distances within 10% of each other) to distances between one second conductive finger corresponding to the one first conductive finger from among the at least two second conductive fingers of the second capacitor element CE2 and the two guard rings GDR. Distances between the remaining first conductive finger among the at least two first conductive fingers of the first capacitor element CE1 and the two guard rings GDR may be equal or substantially equal (e.g., distances within 10% of each other) to distances between the remaining second conductive finger corresponding to the remaining first conductive finger from among the at least two second conductive fingers of the second capacitor element CE2 and the two guard rings GDR.

Distances between one of the at least three third conductive fingers of the third capacitor element CE3 and the at least two first conductive fingers of the first capacitor element CE1 may be equal or substantially equal (e.g., distances within 10% of each other) to distances between another of the at least three third conductive fingers of the third capacitor element CE3 and the at least two second conductive fingers of the second capacitor element CE2. Distances between one of the at least three third conductive fingers of the third capacitor element CE3 and the two guard rings GDR may be equal or substantially equal (e.g., distances within 10% of each other) to distances between another of the at least three third conductive fingers of the third capacitor element CE3 and the two guard rings GDR.

A third conductive finger being the other of the at least three third conductive fingers of the third capacitor element CE3 may be located on the center between the two guard rings GDR along the row direction. Accordingly, distances between the other of the at least three third conductive fingers and the components of the first capacitor element CE1 may be equal or substantially equal (e.g., distances within 10% of each other) to distances between the other of the at least three third conductive fingers and the components of the second capacitor element CE2. Distances between the other of the at least three third conductive fingers and the two guard rings GDR may be equal or substantially equal (e.g., distances within 10% of each other).

Because the second capacitor structure CPS2 is provided to be symmetrical along the row direction between the two guard rings GDR, the parasitic capacitances between the first capacitor element CE1 and the two guard rings GDR may be equal or substantially equal (e.g., parasitic capacitance within 10% of each other) to the parasitic capacitances between the second capacitor element CE2 and the two guard rings GDR. Furthermore, the parasitic capacitances between the third capacitor element CE3 and the two guard rings GDR may be formed to be symmetrical along the row direction.

In one or more embodiments, the first capacitor element CE1 and a corresponding portion (e.g., one of the at least three third conductive fingers) of the third capacitor element CE3 may form the first capacitor C1 of the first attenuator A1, and the second capacitor element CE2 and a corresponding portion (e.g., another of the at least three third conductive fingers) of the third capacitor element CE3 may form the second capacitor C2 of the first attenuator A1.

When the second capacitor structure CPS2 forming the first capacitor C1 and the second capacitor C2 is formed to be symmetrical along the row direction, the parasitic capacitances caused at the first capacitor C1 may be equal or substantially equal (e.g., parasitic capacitances within 10% of each other) to the parasitic capacitances caused at the second capacitor C2. Noises of the same level may be caused at the first capacitor C1 and the second capacitor C2 due to the parasitic capacitances in the second capacitor structure CPS2 and may be mutually cancelled out. Accordingly, the image sensor 100 in which the noise due to parasitic capacitances is reduced may be provided.

Compared to the first capacitor structure CPS1 of FIGS. 6, 7A, 7B, and 7C, the second capacitor structure CPS2 of FIGS. 8, 9A, 9B, and 9C may further include a third conductive finger of the third capacitor element CE3, which is provided in a space between the first capacitor element CE1 and the second capacitor element CE2. The other of the at least three third conductive fingers may increase capacitances of the first capacitor C1 and the second capacitor C2. When a third conductive finger is further provided between the first capacitor C1 and the second capacitor C2, compared to the first capacitor structure CPS1 of FIGS. 6, 7A, 7B, and 7C, the at least two first conductive fingers, the at least two second conductive fingers, and the at least three third conductive fingers that are formed to be shorter in length may be required to implement the first capacitor C1 and the second capacitor C2 to have the same capacitance as the first capacitor structure CPS1. Accordingly, the size of the second capacitor structure CPS2 may be smaller than the size of the first capacitor structure CPS1. For example, the degree of integration may be improved.

According to one or more embodiments in which patterns of two or more metal layers of the second capacitor structure CPS2 are vertically connected by using the contact plates CP is illustrated in FIGS. 9A, 9B, and 9C. However, as understood by one of ordinary skill in the art, via contacts may be provided in lieu of one or more of the contact plates CP. For example, the patterns of the two or more metal layers of the second capacitor structure CPS2 may be vertically connected through one or more via contacts and one or more contact plates CP. In one or more embodiments, locations where via contacts are provided and locations where contact plates may be symmetrical along the row direction.

In one or more examples, the patterns of the two or more metal layers of the second capacitor structure CPS2 may be vertically connected through one or more via contacts, not the contact plates CP. In one or more embodiments, locations where via contacts are provided may be symmetrical along the row direction.

Figure 10:
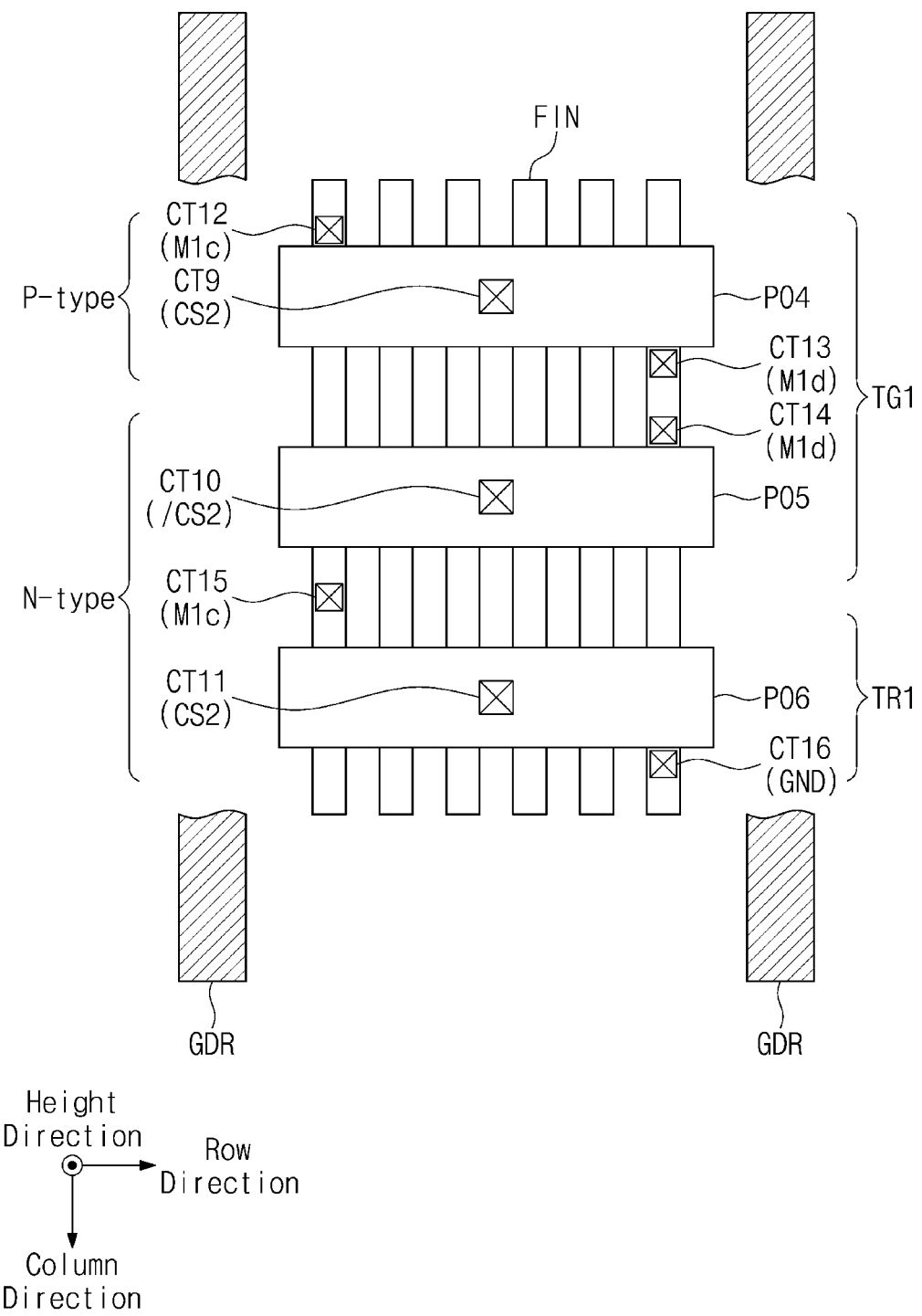
FIG. 10 illustrates a second switch area according to one or more embodiments of the present disclosure.

FIG. 10 illustrates a second switch area SWA2 according to one or more embodiments of the present disclosure. The second switch area SWA2 may correspond to the second transistor TR2 and the second transmission gate TG2 of the second attenuator A2. Referring to FIGS. 1, 3, and 10, the second switch area SWA2 may be provided between two guard rings GDR extending in the column direction parallel to each other. The pitch between the two guard rings GDR may correspond to the size of a pixel from the pixels PX.

A plurality of fins FIN that extend in parallel in the column direction may be provided between the two guard rings GDR. The plurality of fins FIN may protrude in the height direction. A fourth poly pattern PO4, a fifth poly pattern PO5, and a sixth poly pattern PO6 that extend in the row direction perpendicular to the column direction may be provided on the plurality of fins FIN.

The fourth poly pattern PO4 may correspond to a P-type transistor of the second transmission gate TG2. The fins FIN of a first source/drain region and a second source/drain region of the P-type transistor of the second transmission gate TG2, which are adjacent to the fourth poly pattern PO4, may be doped to have a P-type. The fins FIN under the fourth poly pattern PO4, for example, fins of a channel region may be doped to have an N-type. An insulating layer may be provided between the fourth poly pattern PO4 and the fins FIN.

The fourth poly pattern PO4 may be connected to a ninth contact CT9. The fourth poly pattern PO4 may receive the second control signal CS2 through the ninth contact CT9.

The first source/drain region of the P-type transistor of the second transmission gate TG2 may be connected to a twelfth contact CT12. The twelfth contact CT12 may be connected to a conductive material provided in the first metal layer being the lowest, for example, a 1c-th metal wire M1c. The second source/drain region of the P-type transistor of the second transmission gate TG2 may be connected to a thirteenth contact CT13. The thirteenth contact CT13 may be connected to a conductive material provided in the first metal layer being the lowest, for example, a 1d-th metal wire M1d.

The fifth poly pattern PO5 may correspond to an N-type transistor of the second transmission gate TG2. The fins FIN of a first source/drain region and a second source/drain region of the N-type transistor of the second transmission gate TG2, which are adjacent to the fifth poly pattern PO5, may be doped to have an N-type. The fins FIN under the fifth poly pattern PO5, for example, fins of a channel region may be doped to have a P-type conductivity. An insulating layer may be provided between the fifth poly pattern PO5 and the fins FIN.

The fifth poly pattern PO5 may be connected to a tenth contact CT10. The fifth poly pattern PO5 may receive the inverted signal/CS2 of the second control signal CS2 through the tenth contact CT10. The first source/drain region of the N-type transistor of the second transmission gate TG2 may be connected to a fourteenth contact CT14. The fourteenth contact CT14 may be connected to a conductive material provided in the first metal layer being the lowest, for example, a 1d-th metal wire M1d. The second source/drain region of the N-type transistor of the second transmission gate TG2 may be connected to a fifteenth contact CT15. The fifteenth contact CT15 may be connected to a conductive material provided in the first metal layer being the lowest, for example, the 1c-th metal wire M1c.

The sixth poly pattern PO6 may correspond to the second transistor TR2. The fins FIN of a first source/drain region and a second source/drain region of the second transistor TR2, which are adjacent to the sixth poly pattern PO6, may be doped to have an N-type. The fins FIN under the sixth poly pattern PO6, for example, fins of a channel region may be doped to have a P-type. An insulating layer may be provided between the sixth poly pattern PO6 and the fins FIN.

The sixth poly pattern PO6 may be connected to an eleventh contact CT11. The sixth poly pattern PO6 may receive the second control signal CS2 through the eleventh contact CT11. The first source/drain region of the second transistor TR2 may be connected in common to the fifteenth contact CT15 together with the second source/drain region of the N-type transistor of the second transmission gate TG2. The fifteenth contact CT15 may be connected to a conductive material provided in the first metal layer being the lowest, for example, the 1c-th metal wire M1c. The second source/drain region of the second transistor TR2 may be connected to a sixteenth contact CT16. The sixteenth contact CT16 may be connected to the power line through which the ground voltage GND is supplied.

The locations of the ninth to sixteenth contacts CT9 to CT16 may be provided as an example. The locations of the ninth to sixteenth contacts CT9 to CT16 may be modified to be different from those illustrated in FIG. 10.

Figure 11:
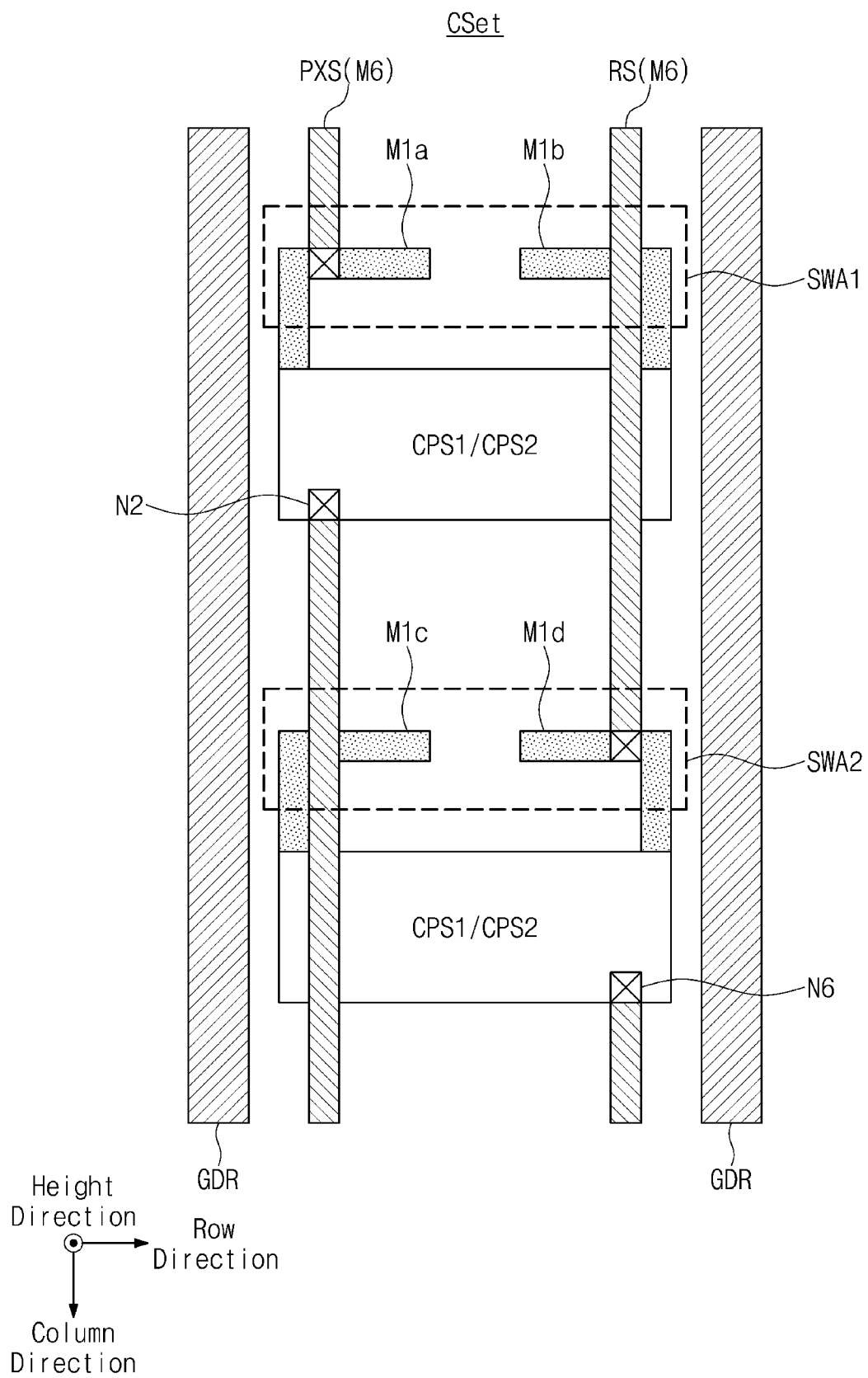
FIG. 11 illustrates an example of a capacitor set in which there are implemented a first capacitor and a second capacitor of a first attenuator and a third capacitor and a fourth capacitor of a second attenuator, which correspond to one column pixels according to one or more embodiments.

FIG. 11 illustrates an example of a capacitor set Cset in which there are implemented the first capacitor C1 and the second capacitor C2 of the first attenuator A1 and the third capacitor C3 and the fourth capacitor C4 of the second attenuator A2, which correspond to one column of pixels PX according to one embodiments. As described with reference to FIG. 4, the analog-to-digital converter AD (reference to FIGS. 2 and 3) is provided between the guard rings GDR of the pitch corresponding to one column of pixels PX.

In one or more examples, an analog-to-digital converter AD includes the first attenuator A1 and the second attenuator A2. For example, an analog-to-digital converter AD may include the first capacitor C1 and the second capacitor C2 of the first attenuator A1 and the third capacitor C3 and the fourth capacitor C4 of the second attenuator A2.

Referring to FIGS. 1, 2, 3, 4, and 11, the first capacitor C1 and the second capacitor C2 of the first attenuator A1 may be provided to be symmetrical along the row direction, and the third capacitor C3 and the fourth capacitor C4 of the second attenuator A2 may be provided to be symmetrical along the row direction. The third capacitor C3 and the fourth capacitor C4 of the second attenuator A2 may be spaced from the first capacitor C1 and the second capacitor C2 of the first attenuator A1 along the column direction and may be provided between two guard rings GDR to be symmetrical along the row direction. The two guard rings GDR may have the same structure and/or made of the same material.

The first capacitor C1 and the second capacitor C2 of the first attenuator A1 may be implemented with the first capacitor structure CPS1 or the second capacitor structure CPS2. In one or more examples, the third capacitor C3 and the fourth capacitor C4 of the second attenuator A2 may be implemented with the first capacitor structure CPS1 or the second capacitor structure CPS2.

The first capacitor structure CPS1 or the second capacitor structure CPS2 of the first attenuator A1 may be controlled by the first transistor TR1 and the first transmission gate TG1 of the first switch area SWA1. The first capacitor structure CPS1 or the second capacitor structure CPS2 of the second attenuator A2 may be controlled by the second transistor TR2 and the second transmission gate TG2 of the second switch area SWA2.

A pattern of the sixth metal layer M6 that propagates the pixel signal PXS to the first switch area SWA1, a pattern of the sixth metal layer M6 that is connected to the third node N3 of the first attenuator A1 and transfers the output signal from the first attenuator A1, a pattern of the sixth metal layer M6 that propagates the ramp signal RS to the second switch area SWA2, and a pattern of the sixth metal layer M6 that is connected to the sixth node N6 of the second attenuator A2 and propagates the output signal from the second attenuator A2 may be symmetrical along the row direction.

For example, distances between the pattern of the sixth metal layer M6 propagating the pixel signal PXS and the guard rings GDR may be equal or substantially equal (e.g., distances within 10% of each other) to distances between the pattern of the sixth metal layer M6 transferring the ramp signal RS and the guard rings GDR. Distances between the pattern of the sixth metal layer M6 extending from the second node N2 and the guard rings GDR may be equal or substantially equal (e.g., distances within 10% of each other) to distances between the pattern of the sixth metal layer M6 extending from the sixth node N6 and the guard rings GDR.

In one or more embodiments, the pattern of the sixth metal layer M6 extending from the third node N3 may transfer the pixel signal PXS that is attenuated by the first attenuator A1 or is passed without attenuation. The pattern of the sixth metal layer M6 extending from the sixth node N6 may propagate the ramp signal RS that is attenuated by the second attenuator A2 or is passed without attenuation.

Figure 12:
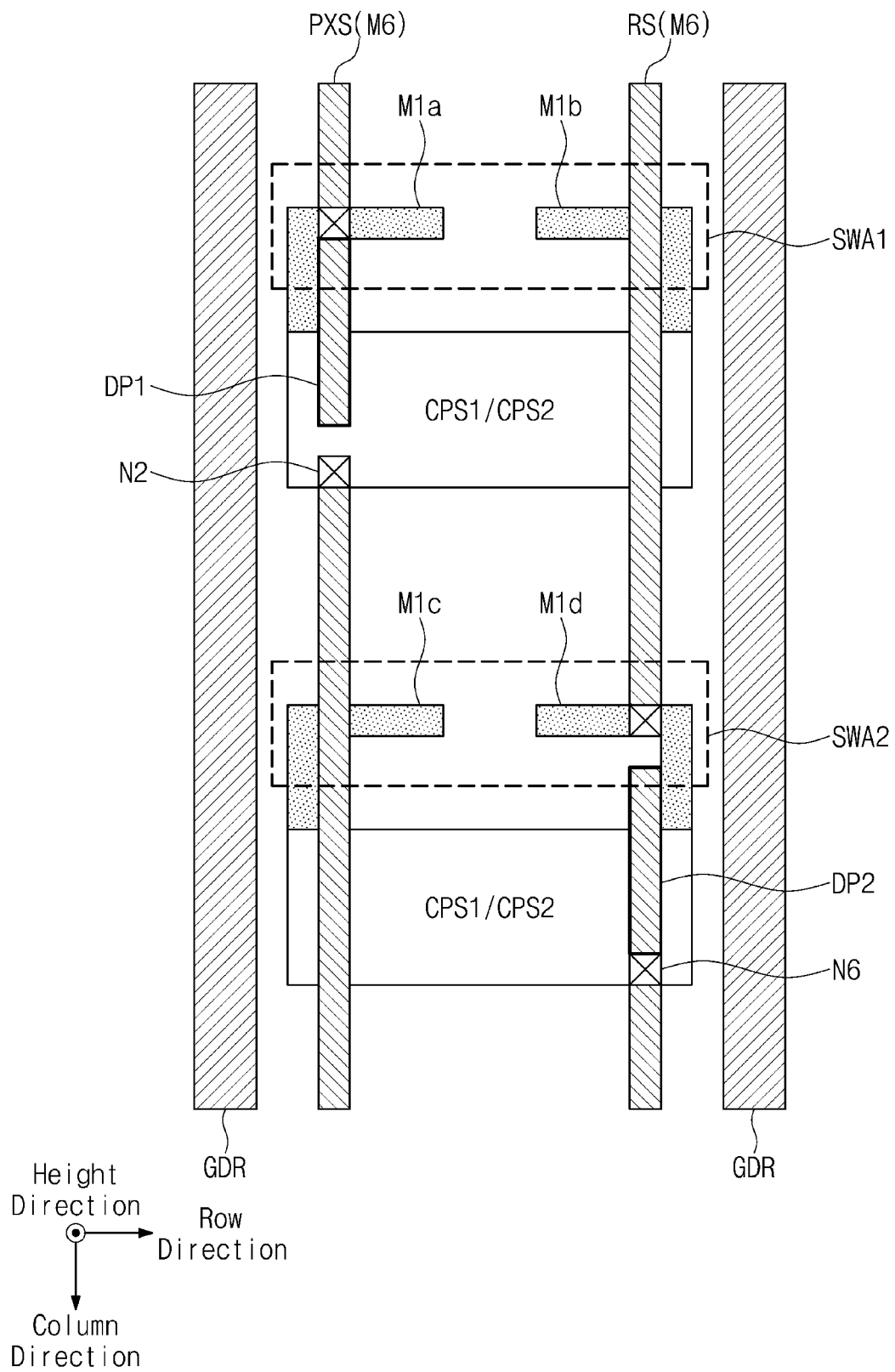
FIG. 12 illustrates a capacitor set of one or more embodiments modified from a capacitor set of FIG. 11 according to one or more embodiments.

FIG. 12 illustrates a capacitor set Cset1 of one or more embodiments modified from the capacitor set Cset of FIG. 11. For example, FIG. 12 illustrates a capacitor set Cset1 in which there are implemented the first capacitor C1 and the second capacitor C2 of the first attenuator A1 and the third capacitor C3 and the fourth capacitor C4 of the second attenuator A2, which correspond to one column of pixels PX.

Compared to the capacitor set Cset of FIG. 11, the capacitor set Cset1 of FIG. 12 may further include a first dummy pattern DP1 and a second dummy pattern DP2. The first dummy pattern DP1 and the second dummy pattern DP2 may correspond to an upper metal line of the first capacitor structure CPS1 or the second capacitor structure CPS2. For example, the first dummy pattern DP1 and the second dummy pattern DP2 may be patterns of the sixth metal layer M6 where the patterns for transferring the pixel signal PXS and the ramp signal RS are provided.

The first dummy pattern DP1 may extend in a direction facing away from the pattern of the sixth metal layer M6 transferring the pixel signal PXS. The first dummy pattern DP1 may compensate for a difference between parasitic capacitances caused when a column-direction length of the pattern of the sixth metal layer M6 transferring the pixel signal PXS is shorter than a column-direction length of the pattern of the sixth metal layer M6 transferring the ramp signal RS.

The second dummy pattern DP2 may extend in a direction facing away from the pattern of the sixth metal layer M6 transferring the signal of the sixth node N6. The second dummy pattern DP2 may compensate for a difference between parasitic capacitances caused when a column-direction length of the pattern of the sixth metal layer M6 extending from the third node N3 is longer than a column-direction length of the pattern of the sixth metal layer M6 extending from the sixth node N6.

As the first dummy pattern DP1 and the second dummy pattern DP2 improve the symmetry of the first capacitor structure CPS1 or the second capacitor structure CPS2, differences between parasitic capacitances may decrease, thereby advantageously decreasing the influences of the parasitic capacitances.

In one or more embodiments, an analog-to-digital converter AD includes the first attenuator A1 and the second attenuator A2. When two analog-to-digital converters AD are provided at one column of pixels PX, two first attenuators A1 and two second attenuators A2 may be provided between the guard rings GDR. In one or more embodiments, the first attenuator A1 and the second attenuator A2 corresponding to one of the two analog-to-digital converters AD may be sequentially provided along the column direction between the guard rings GDR, and the first attenuator A1 and the second attenuator A2 corresponding to the other of the two analog-to-digital converters AD may be sequentially provided along the column direction between the guard rings GDR.

Figure 13:
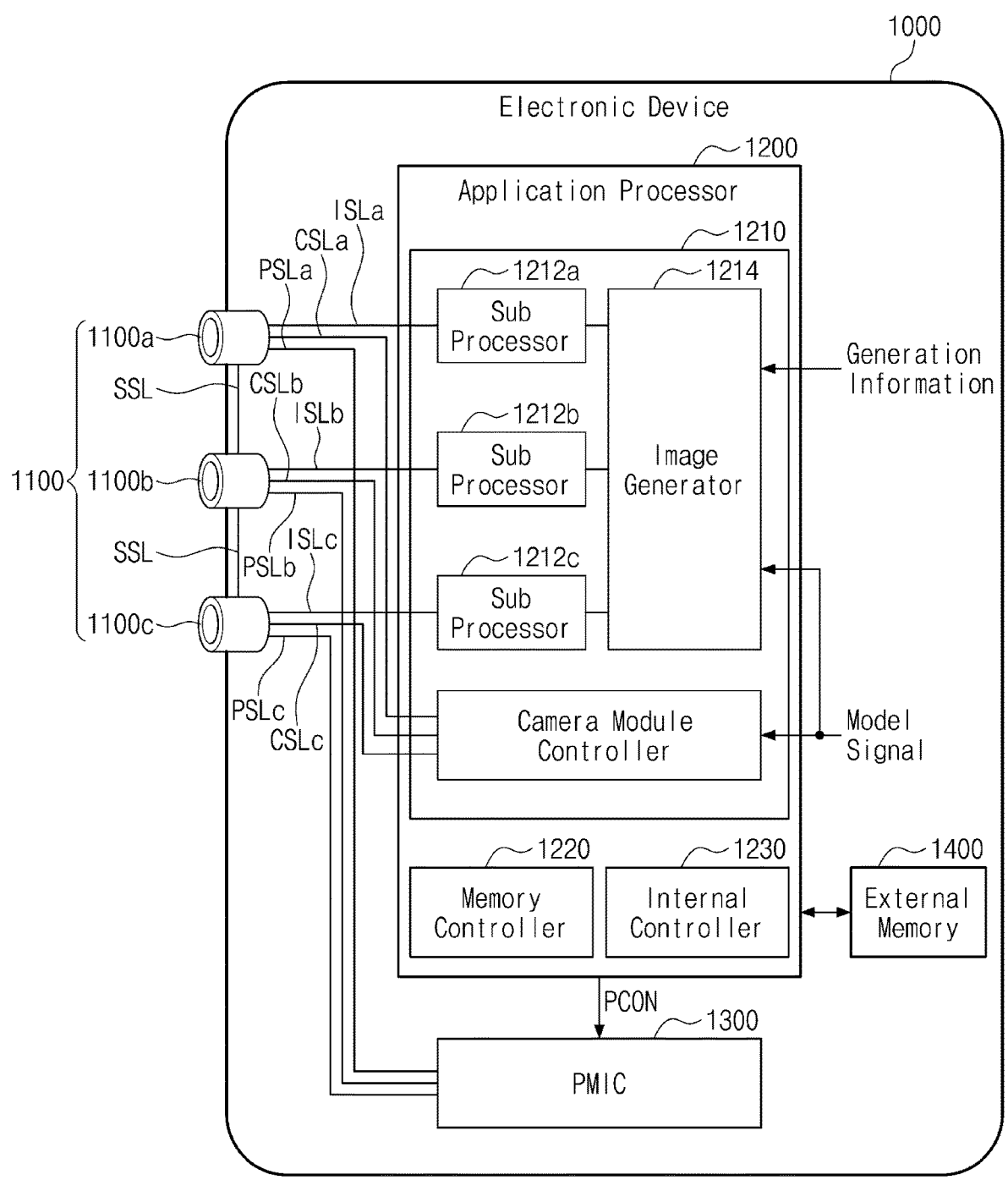
FIG. 13 is a block diagram of an electronic device including a multi-camera module according to one or more embodiments.
Figure 14:
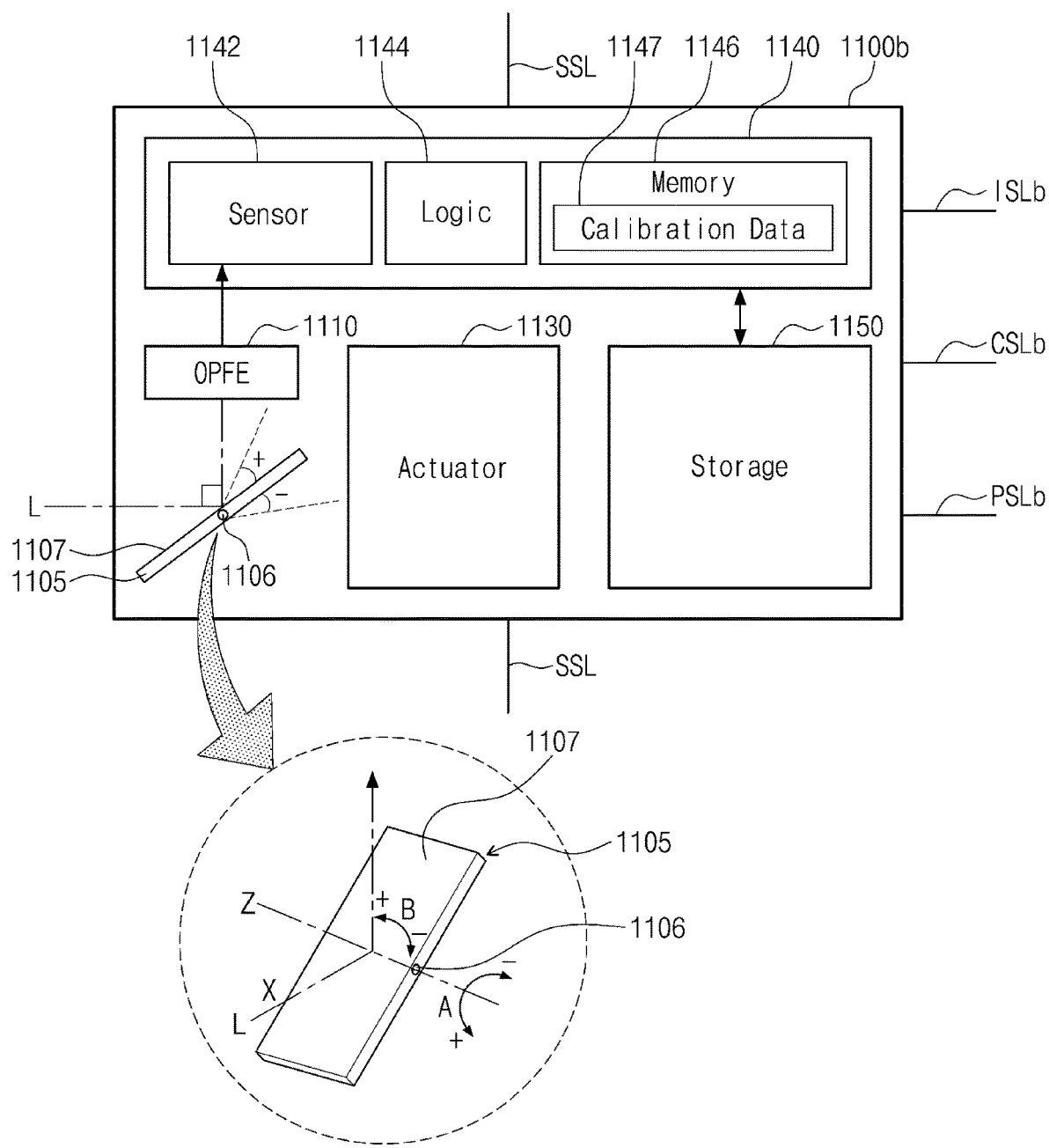
FIG. 14 is a detailed block diagram of a camera module of FIG. 13 according to one or more embodiments.

FIG. 13 is a block diagram of an electronic device including a multi-camera module according to one or more embodiments. FIG. 14 is a block diagram illustrating a camera module of FIG. 13 in detail according to one or more embodiments.

Referring to FIG. 13, an electronic device 1000 may include a camera module group 1100, an application processor 1200, a PMIC 1300, and an external memory 1400.

The camera module group 1100 may include a plurality of camera modules 1100a, 1100b, and 1100c. An electronic device including three camera modules 1100a, 1100b, and 1100c is illustrated in FIG. 13, but the present disclosure is not limited thereto. In some embodiments, the camera module group 1100 may be modified to include only two camera modules, or any other suitable number of camera modules. In some embodiments, the camera module group 1100 may be modified to include "j" camera modules (e.g., j being a positive integer of 4 or more).

Below, a detailed configuration of the camera module 1100b will be more fully described with reference to FIG. 14, but the following description may be equally applied to the remaining camera modules 1100a and 1100c.

Referring to FIG. 14, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some embodiments, the prism 1105 may change a path of the light "L" incident in a first direction (X) to a second direction (Y) perpendicular to the first direction (X). Furthermore, the prism 1105 may change the path of the light "L" incident in the first direction (X) to the second direction (Y) perpendicular to the first (X-axis) direction by rotating the reflecting plane 1107 of the light reflecting material in direction "A" about a central axis 1106 or rotating the central axis 1106 in direction "B". In this case, the OPFE 1110 may move in a third direction (Z) perpendicular to the first direction (X) and the second direction (Y).

In some embodiments, as illustrated in FIG. 14, a maximum rotation angle of the prism 1105 in direction "A" may be equal to or smaller than 15 degrees in a positive A direction and may be greater than 15 degrees in a negative A direction, but the present disclosure is not limited thereto.

In some embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., Z direction) parallel to a direction in which the central axis 1106 extends.

The OPFE 1110 may include optical lenses composed of "i" groups (e.g., i being a positive integer), for example. Here, "i" lens may move in the second direction (Y) to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "i" optical lens included in the OPFE 1110.

The actuator 1130 may move the OPFE 1110 or an optical lens (e.g., hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens.

The control logic 1144 may control overall operations of the camera module 1100b. For example, the control logic 1144 may control an operation of the camera module 1100*b* based on a control signal provided through a control signal line CSLb.

The memory 1146 may store information, which is necessary for an operation of the camera module 1100*b*, such as calibration data 1147. The calibration data 1147 may include information necessary for the camera module 1100*b* to generate image data by using the light "L" provided from the outside. The calibration data 1147 may include, for example, information about the degree of rotation described above, information about a focal length, information about an optical axis, etc. In the case where the camera module 1100*b* is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some embodiments, the storage 1150 may be implemented with an electrically erasable programmable read only memory (EEPROM), but the present disclosure is not limited thereto.

Referring together to FIGS. 13 and 14, in some embodiments, each of the plurality of camera modules 1100*a*, 1100*b*, and 1100*c* may include the actuator 1130. Therefore, the same calibration data 1147 or different calibration data 1147 may be included in the plurality of camera modules 1100*a*, 1100*b*, and 1100*c* depending on operations of the actuators 1130 therein.

In some embodiments, one camera module (e.g., 1100*b*) among the plurality of camera modules 1100*a*, 1100*b*, and 1100*c* may be a folded lens shape of camera module in which the prism 1105 and the OPFE 1110 described above are included, and the remaining camera modules (e.g., 1100*a* and 1100*c*) may be a vertical shape of camera module in which the prism 1105 and the OPFE 1110 described above are not included. However, as understood by one of ordinary skill in the art, the present disclosure is not limited to these configurations.

In some embodiments, one camera module (e.g., 1100*c*) among the plurality of camera modules 1100*a*, 1100*b*, and 1100*c* may be, for example, a vertical shape of depth camera extracting depth information by using an infrared ray (IR). In this case, the application processor 1200 may merge image data provided from the depth camera and image data provided from any other camera module (e.g., 1100*a* or 1100*b*) and may generate a three-dimensional (3D) depth image.

In some embodiments, at least two camera modules (e.g., 1100*a* and 1100*b*) among the plurality of camera modules 1100*a*, 1100*b*, and 1100*c* may have different fields of view. In this case, the at least two camera modules (e.g., 1100*a* and 1100*b*) among the plurality of camera modules 1100*a*, 1100*b*, and 1100*c* may include different optical lens, but the present disclosure is not limited thereto.

In some embodiments, fields of view of the plurality of camera modules 1100*a*, 1100*b*, and 1100*c* may be different. In this case, the plurality of camera modules 1100*a*, 1100*b*, and 1100*c* may include different optical lens, not limited thereto.

In some embodiments, the plurality of camera modules 1100*a*, 1100*b*, and 1100*c* may be disposed to be physically separated from each other. For example, the plurality of camera modules 1100*a*, 1100*b*, and 1100*c* may not use a sensing area of one image sensor 1142, but the plurality of camera modules 1100*a*, 1100*b*, and 1100*c* may include independent image sensors 1142 therein, respectively.

Returning to FIG. 13, the application processor 1200 may include an image processing device 1210, a memory controller 1220, and an internal memory 1230. The application processor 1200 may be implemented to be separated from the plurality of camera modules 1100*a*, 1100*b*, and 1100*c*. For example, the application processor 1200 and the plurality of camera modules 1100*a*, 1100*b*, and 1100*c* may be implemented with separate semiconductor chips.

The image processing device 1210 may include a plurality of sub image processors 1212*a*, 1212*b*, and 1212*c*, an image generator 1214, and a camera module controller 1216.

The image processing device 1210 may include the plurality of sub image processors 1212*a*, 1212*b*, and 1212*c*, the number of which corresponds to the number of the plurality of camera modules 1100*a*, 1100*b*, and 1100*c*.

Image data generated from the camera modules 1100*a*, 1100*b*, and 1100*c* may be provided to the corresponding sub image processors 1212*a*, 1212*b*, and 1212*c*, respectively, through separated image signal lines ISLa, ISLb, and ISLc, respectively. For example, the image data generated from the camera module 1100*a* may be provided to the sub image processor 1212*a* through the image signal line ISLa, the image data generated from the camera module 1100*b* may be provided to the sub image processor 1212*b* through the image signal line ISLb, and the image data generated from the camera module 1100*c* may be provided to the sub image processor 1212*c* through the image signal line ISLc. This image data transmission may be performed, for example, by using a camera serial interface (CSI) based on the MIPI (Mobile Industry Processor Interface), but the present disclosure is not limited thereto.

In some embodiments, one sub image processor may be disposed to correspond to a plurality of camera modules. For example, the sub image processor 1212*a* and the sub image processor 1212*c* may be integrally implemented, not separated from each other as illustrated in FIG. 13. In this case, one of the pieces of image data respectively provided from the camera module 1100*a* and the camera module 1100*c* may be selected through a selection element (e.g., a multiplexer), and the selected image data may be provided to the integrated sub image processor.

The image data provided to the sub image processors 1212*a*, 1212*b*, and 1212*c* may be provided to the image generator 1214. The image generator 1214 may generate an output image by using the image data provided from the sub image processors 1212*a*, 1212*b*, and 1212*c*, depending on image generating information such as Generating Information or a mode signal.

In one or more examples, the image generator 1214 may generate the output image by merging at least a portion of the image data respectively generated from the camera modules 1100*a*, 1100*b*, and 1100*c* having different fields of view, depending on the image generating information such as Generating Information or the mode signal. Furthermore, the image generator 1214 may generate the output image by selecting one of the image data generated from the camera modules 1100*a*, 1100*b*, and 1100*c* having different fields of view, depending on the image generating information such as Generating Information or the mode signal.

In some embodiments, the image generating information such as Generating Information may include a zoom signal or a zoom factor. In some embodiments, the mode signal may be, for example, a signal based on a mode selected from a user.

In the case where the image generating information such as Generating Information is the zoom signal (or zoom factor) and the camera modules 1100a, 1100b, and 1100c have different visual fields of view, the image generator 1214 may perform different operations depending on a type of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and a way to process image data may be modified without limitation if necessary.

In some embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information such as Generating Information including a zoom signal or the mode signal, and the remaining camera modules (e.g., 1100a and 1100c) may be designated as a slave camera. The above designation information may be included in the control signals, and the control signals including the designation information may be provided to the corresponding camera modules 1100a, 1100b, and 1100c through the control signal lines CSLa, CSLb, and CSLc, respectively, separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals such as the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one of the sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Furthermore, a level of a power may be dynamically changed.

The image sensor 1142 may include the image sensor 100 described with reference to FIGS. 1 to 12. For example, the image sensor 1142 may include the pixel array 110, the row driver 120, the ramp signal generator (RSG) 130, the attenuation circuit 140, the analog-to-digital conversion circuit 150, the memory circuit 160, and the control circuit 170.

Transistors of the image sensor 1142 may be designed and implemented by using one or more of the ultra-fine semiconductor process such as a FINFET process, a GAA process, or a nano sheet process. The first attenuators A1 and the second attenuators A2 of the attenuation circuit 140 may include a first capacitor structure corresponding to the first capacitor C1 and the second capacitor C2 and a second capacitor structure corresponding to the third capacitor C3 and the fourth capacitor C4.

The first capacitor structure may be identical in structure to the second capacitor structure. The first capacitor structure and the second capacitor structure may be disposed along the column direction between guard rings having the pitch corresponding to the size of a pixel from the pixels PX. The first capacitor structure may be disposed between the guard rings so as to be symmetrical along a direction perpendicular to a direction in which the guard rings extend. The second capacitor structure may be disposed between the guard rings so as to be symmetrical along the direction perpendicular to the direction in which the guard rings extend.

As the capacitor structures are disposed to be symmetrical, parasitic capacitances caused between the capacitor structures and the guard rings may also be symmetrical. Accordingly, the influences of the parasitic capacitance may be cancelled out, and noises due to the parasitic capacitances may be suppressed.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to embodiments of the present disclosure, capacitors of an attenuator are provided to be symmetrical. Parasitic capacitances are formed to be symmetrical, and influences of noises caused by the parasitic capacitances decrease. Accordingly, an image sensor having a reduced noise and a camera module including the image sensor are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image sensor comprising:
   a pixel array including a plurality of pixels;
   a ramp signal generator configured to generate a ramp signal;
   a plurality of first attenuators with each first attenuator connected to a respective column of the plurality of pixels, and each first attenuator configured to receive a pixel signal from a respective pixel belonging to a selected row from among the plurality of pixels;
   a plurality of second attenuators with each second attenuator corresponding to the respective column of the plurality of pixels, and each second attenuator configured to receive the ramp signal from the ramp signal generator; and
   a plurality of analog-to-digital converters configured to output digital signals by comparing first signals output from the plurality of first attenuators and second signals output from the plurality of second attenuators,
   wherein each of the plurality of first attenuators and each of the plurality of second attenuators comprises a first capacitor and a second capacitor, and
   wherein the first capacitor and the second capacitor are between two guard rings having a pitch corresponding to one column from columns of the plurality of pixels and are arranged sequentially along a second direction perpendicular to a first direction in which the two guard rings extend so as to be symmetrical along the second direction.

2. The image sensor of claim 1, wherein the first capacitor and the second capacitor comprise:
   a first conductive material extending along the second direction; and
   a second conductive material extending along the second direction and isolated from the first conductive material;
   at least two first conductive fingers extending from the first conductive material and parallel along the first direction; and
   at least two second conductive fingers extending from the second conductive material and parallel along the first direction.

3. The image sensor of claim 2, wherein each of the first capacitor and the second capacitor further comprises:
   a third conductive material extending along the second direction; and
   at least two third conductive fingers extending from the third conductive material along a direction away from the first direction.

4. The image sensor of claim 3, wherein one of the at least two third conductive fingers extends between the at least two first conductive fingers along the direction away from the first direction, and
   wherein the other of the at least two third conductive fingers extends between the at least two second conductive fingers along the direction away from the first direction.

5. The image sensor of claim 3, wherein one of the at least two third conductive fingers extends along the direction away from the first direction in a space between the at least two first conductive fingers and the at least two second conductive fingers.

6. The image sensor of claim 5, wherein the first conductive material, the at least two first conductive fingers, the second conductive material, the at least two second conductive fingers, the third conductive material, and the at least two third conductive fingers are in two or more metal layers.

7. The image sensor of claim 6, wherein the first conductive material, the at least two first conductive fingers, the second conductive material, the at least two second conductive fingers, the third conductive material, and the at least two third conductive fingers in the two or more metal layers are connected through one or more contact plates.

8. The image sensor of claim 5, wherein the first conductive material corresponds to a first terminal of the first capacitor,
wherein the second conductive material corresponds to a first terminal of the second capacitor, and
wherein the third conductive material corresponds to a second terminal of the first capacitor and a second terminal of the second capacitor.

9. The image sensor of claim 5, wherein each of the plurality of first attenuators further comprises:
a first transistor including a gate to which a first control signal is input, a first terminal connected to the second conductive material, and a second terminal connected to a ground node to which a ground voltage is applied; and
a first transmission gate controlled by the first control signal and an inverted signal of the first control signal and connected between the second conductive material and a column line of a corresponding column among the columns of the plurality of pixels,
wherein the first conductive material is connected to the column line of the corresponding column.

10. The image sensor of claim 9, wherein the third conductive material is connected to a first input of a corresponding analog-to-digital converter among the plurality of analog-to-digital converters.

11. The image sensor of claim 9, wherein the first transistor and the first transmission gate are implemented by using one or more of ultra-fine semiconductor processes including a FINFET process, a gate-all-around (GAA) process, and a nano sheet process.

12. The image sensor of claim 5, wherein each of the plurality of second attenuators further comprises:
a second transistor including a gate to which a second control signal is input, a first terminal connected to the second conductive material, and a second terminal connected to a ground node to which a ground voltage is applied; and
a second transmission gate controlled by the second control signal and an inverted signal of the second control signal and connected between the second conductive material and a conductive line through which the ramp signal is transferred,
wherein the first conductive material is connected to the conductive line through which the ramp signal is transferred.

13. The image sensor of claim 12, wherein the third conductive material is connected to a second input of a corresponding analog-to-digital converter among the plurality of analog-to-digital converters.

14. The image sensor of claim 12, wherein before the plurality of analog-to-digital converters generate the digital signals from the pixel signals, a level of the second control signal is adjusted depending on an operating mode.

15. The image sensor of claim 5, wherein the first capacitor and the second capacitor of a second attenuator corresponding to one column among the columns of the plurality of pixels are between the two guard rings so as to be spaced from the first capacitor and the second capacitor of a first attenuator corresponding to the one column along the first direction.

16. The image sensor of claim 15, wherein the first conductive material of the first capacitor and the second capacitor of the first attenuator is connected to a first contact, and the first contact is connected to a first upper metal line extending from the first contact along the direction away from the first direction,
wherein the third conductive material of the first capacitor and the second capacitor of the first attenuator is connected to a second contact, and the second contact is connected to a second upper metal line extending from the second contact along the first direction, and
wherein a distance between the two guard rings corresponding to the one column and the first upper metal line is equal or substantially equal to a distance between the two guard rings and the second upper metal line.

17. The image sensor of claim 16, wherein the second conductive material of the first capacitor and the second capacitor of the second attenuator is connected to a third contact, and the third contact is connected to a third upper metal line extending from the third contact along the direction away from the first direction,
wherein the third conductive material of the first capacitor and the second capacitor of the second attenuator is connected to a fourth contact, and the fourth contact is connected to a fourth upper metal line extending from the fourth contact along the first direction, and
wherein a distance between the two guard rings corresponding to the one column and the third upper metal line is equal or substantially equal to a distance between the two guard rings and the fourth upper metal line.

18. The image sensor of claim 17, wherein the first contact is connected to a first dummy upper metal line extending from the first contact along the first direction and spaced from the second upper metal line,
wherein the fourth contact is connected to a second dummy upper metal line extending from the fourth contact along the direction away from the first direction and spaced from the third upper metal line, and
wherein a distance between the two guard rings and the first dummy upper metal line is equal or substantially equal to a distance between the two guard rings and the second dummy upper metal line.

19. A camera module comprising:
a lens;
a pixel array including a plurality of pixels configured to receive a light through the lens;
a ramp signal generator configured to generate a ramp signal;
a plurality of first attenuators with each first attenuator connected to a respective column of the plurality of pixels, and each first attenuator configured to receive a pixel signal from a respective pixel belonging to a selected row from among the plurality of pixels;
a plurality of second attenuators with each second attenuator corresponding to the respective column of the plurality of pixels, and each second attenuator configured to receive the ramp signal from the ramp signal generator; and
a plurality of analog-to-digital converters configured to output digital signals by comparing first signals output from the plurality of first attenuators and second signals output from the plurality of second attenuators;

a memory configured to store the digital signals;
a logic circuit configured to perform a compensation operation on the digital signals stored in the memory; and
an interface circuit configured to output the digital signals experiencing the compensation operation to an external device in units of one or more frames,
wherein each of the plurality of first attenuators and each of the plurality of second attenuators comprises a first capacitor and a second capacitor, and
wherein the first capacitor and the second capacitor are between two guard rings having a pitch corresponding to one column among columns of the plurality of pixels and are arranged sequentially along a direction perpendicular to a direction in which the two guard rings extend so as to be symmetrical along the direction perpendicular to the direction in which the two guard rings extend.

20. An image sensor comprising:
a pixel array including a plurality of pixels;
a ramp signal generator configured to generate a ramp signal; and
a plurality of first attenuators with each first attenuator connected to a respective column of the plurality of pixels, and each first attenuator configured to receive a pixel signal from a respective pixel belonging to a selected row from among the plurality of pixels;
a plurality of second attenuators with second attenuator corresponding to the respective column of the plurality of pixels, and each second attenuator configured to receive the ramp signal from the ramp signal generator; and
a plurality of analog-to-digital converters configured to output digital signals by comparing first signals output from the plurality of first attenuators and second signals output from the plurality of second attenuators,
wherein each of the plurality of first attenuators and each of the plurality of second attenuators comprises a first capacitor and a second capacitor,
wherein the first capacitor and the second capacitor are between two guard rings having a pitch corresponding to one column among columns of the plurality of pixels so as to be symmetrical along a second direction perpendicular to a first direction in which the two guard rings extend,
wherein the first capacitor and the second capacitor comprise:
a first conductive material extending along the second direction,
a second conductive material extending along the second direction and isolated from the first conductive material,
at least two first conductive fingers extending from the first conductive material to be parallel along the first direction,
at least two second conductive fingers extending from the second conductive material to be parallel along the first direction,
a third conductive material extending along the second direction, and
at least two third conductive fingers extending from the third conductive material along a direction away from the first direction,
wherein one of the at least two third conductive fingers extends between the at least two first conductive fingers along the direction away from the first direction, and
wherein the other of the at least two third conductive fingers extends between the at least two second conductive fingers along the direction away from the first direction.

* * * * *